United States Patent [19]

Ihsikawa et al.

[11] Patent Number: 5,004,898

[45] Date of Patent: Apr. 2, 1991

[54] OPTICAL READING DEVICE

[75] Inventors: Hiroshi Ihsikawa; Kazuo Hasegawa, both of Furukawa; Masaki Gotoh, Sendai, all of Japan

[73] Assignee: Alps Electric Co., Ltd., Tokyo, Japan

[21] Appl. No.: 392,232

[22] Filed: Aug. 9, 1989

[30] Foreign Application Priority Data

| Nov. 25, 1988 | [JP] | Japan | 63-296286 |
| Nov. 25, 1988 | [JP] | Japan | 63-296287 |
| Nov. 25, 1988 | [JP] | Japan | 63-296288 |
| Nov. 25, 1988 | [JP] | Japan | 63-296289 |
| Dec. 15, 1988 | [JP] | Japan | 63-315027 |
| Dec. 15, 1988 | [JP] | Japan | 63-315028 |
| Feb. 2, 1989 | [JP] | Japan | 1-22666 |
| Feb. 6, 1989 | [JP] | Japan | 1-25907 |
| Feb. 6, 1989 | [JP] | Japan | 1-25908 |
| Feb. 6, 1989 | [JP] | Japan | 1-25909 |

[51] Int. Cl.[5] .................................. G06K 13/00
[52] U.S. Cl. .................................. 235/475; 235/483; 235/485; 235/486
[58] Field of Search ............... 235/463, 475, 476, 477, 235/483, 484, 485, 486

[56] References Cited

U.S. PATENT DOCUMENTS

| 4,147,295 | 4/1979 | Nojiri et al. | 235/463 |
| 4,800,258 | 1/1989 | Suzuki | 235/475 |
| 4,866,259 | 9/1989 | Bonnemoy | 235/486 |
| 4,952,786 | 8/1990 | Inoue | 235/476 |

Primary Examiner—Harold Pitts
Attorney, Agent, or Firm—Guy W. Shoup

[57] ABSTRACT

An optical reading device which is capable of being assembled readily and assures stabilization of the distance between a sensor of the reflecting type and a surface of a medium to be read by the sensor. The sensor is carried on a holding member, and an engaging member is pivotally supported on the holding member at a location spaced from the sensor. A screw shaft and a guide shaft extend in parallel to each other and to an axis of pivotal motion of the engaging member. The screw shaft has a spiral groove formed thereon for meshing engagement with a toothed portion formed on the engaging member or the holding member and is rotated to move the holding and engaging members therealong. A record medium to be read by the sensor is fed in a direction perpendicular to the screw shaft. A contact element is provided on the holding member for assuring a minimum distance between the sensor and a surface of the record medium to be read by the sensor. A resilient member is disposed between the holding and engaging members for urging them such that the contact element may be resiliently contacted with a sliding face and the toothed portion may be resiliently engaged with the spiral groove of the screw shaft.

25 Claims, 24 Drawing Sheets

OPTICAL READING DEVICE

BACKGROUND OF THE INVENTION

1. Field of the Invention

This invention relates to an optical reading device wherein a record medium on which information is recorded optically in accordance with a code system such as, for example, a bar code system is fed in a transverse direction to the direction in which the information is recorded on the record medium in order to read the information, and more particularly to an optical reading device which includes an improved reading mechanism.

2. Description of the Relevant Art

In recent years, as the office automation proceeds, attention is paid to such an optical reading device as disclosed, for example, in European Patent No. 70,697, which can read coded information additionally recorded in the form of a bar code on a record medium and make an automatic dialing operation in accordance with the code information thus read. As the medium for such automatic dialing operation, such a medium as shown, for example, in FIGS. 1, 5 and 10 of British Patent No. 2,063,010 may be employed wherein a telephone number is represented, at a location of a card such as a name card outside an area in which characters are printed, in a bar code representation corresponding to information of the printed characters. An optical reading device can thus read the telephone number and make an automatic dialing operation as shown, for example, in Japanese Patent Laid-Open No. 60-163,154.

Where cards such as name cards have a bar code representation corresponding to formation of addresses and so forth printed thereon, management of the cards can be made sufficiently readily.

While bar code representation systems where name cards are employed as a medium are not yet standardized, it can be sufficiently forecast that, if such systems are standardized and normalized, then name cards on which a bar code representation is printed will come into wide use. As such name cards come into wide use, it is anticipated that demands for code reading devices for reading bar code information on the cards will increase progressively.

An optical reading device for such application normally includes a bar code sensor which includes a light emitting element and a light receiving element, a lens, an optical fiber and so forth in combination. The bar code sensor is moved back and forth in a direction perpendicular to the feeding direction of a name card under the guidance of a screw shaft and a guide shaft. A detecting mechanism which involves such reciprocatory movement is disclosed, for example, in FIG. 1 of Japanese Patent Publication No. 45-13,858 or British Patent No. 1,324,448.

Such a medium in the form of a name card on which a bar code representation is printed at a location other than an area of printed characters thereon in a direction perpendicular to the direction in which it is to be fed in a reading device as described above is inserted in a predetermined direction into an optical reading device. As shown in FIG. 5 of British Patent No. 2,063,010, the name card thus inserted from a lateral side edge thereof is fed by a driving force of a stepping motor or the like installed in the optical reading device while being maintained in a proper orientation until it is stopped at a predetermined position at which the bar code information including a plurality of lines of coded bars is read by such a bar code sensor as described above. With the construction, much information represented on a medium can be read as in such a paper feeding mechanism as is employed, for example, in a well known facsimile apparatus.

Where the bar code representation includes a plurality of lines of code bars, at first the bar code sensor is moved relative to and then scans the first line of code bars, and then a similar operation is successively performed for the second to last lines of code bars, and after completion of the reading operation, the name card is discharged from the optical reading device, similarly as in a well known facsimile apparatus.

By the way, where a bar code sensor has a small size, the depth of focus of the bar code sensor for scanning is shallow. Accordingly, in order to assure a high degree of reading accuracy, it is necessary that the distance between the bar code sensor and a read area of a medium in the form of name card which is to be read by the bar code sensor be maintained stably. However, in such a conventional optical reading device as described above, if it is intended to stabilize the distance between the bar code sensor and such read area of the name card, then the bar code sensor must be maintained at a predetermined height while it is moved back and forth. To this end, the positions in which a screw shaft and a guide shaft are mounted must be specified strictly. Accordingly, a high degree of assembling accuracy is required and deterioration in facility in assembly or increase in production cost cannot be avoided. Further, since name cards have different thicknesses, if a name card inserted in the optical reading device has a thickness greater than a standard one, then the predetermined distance cannot be assured between the bar code sensor and a read area of the name card to be read by the bar code sensor. Consequently, there is the possibility that an error in reading may take place.

Similarly, even a small error of the locations at which the screw shaft and the guide shaft are mounted will lead to an error in height of a path along which the bar code sensor is moved back and forth. Consequently, the distance between the bar code sensor and the area of the name card to be read is unstable, and it is difficult to stabilize the distance. Accordingly, there is the possibility that an error in reading may take place readily, and a degree of accuracy in assembly is required in order to eliminate this. Besides, where there is an error in distance between the screw shaft and the guide shaft which extend through a carrier for the bar code sensor, they cannot guide the sensor carrier smoothly therealong. Also from the point of view, a high degree of accuracy in assembly is required, and deterioration in facility in assembly and increase in production cost cannot be avoided.

It may seem recommendable to stabilize the bar code sensor and the area of the name card to be read by the bar code sensor by resiliently pressing a contact piece of a solid member to be moved back and forth in an integral relationship with the bar code sensor against the medium or name card, for example, in a preceding relationship to the read area of the name card. However, if the solid member the contact piece of which is pressed against the name card is moved together with the bar code sensor, then it may likely damage or soil the read area of the name card to be read. Consequently, there is the possibility that an error in reading may take place contrary to the expectation or that, depending upon a material of the medium, dust may be produced from the medium and stick to a lens of the bar code sensor. Further, if it is attempted to feed the medium while the contact piece is held in resilient contact with the medium, there is the possibility that such feeding of the medium may be disturbed by a frictional force between the medium and the contact piece of the member mentioned above and insertion or discharging of the medium may sometimes be disabled. Besides, a special contrivance is required for eliminating such a possible situation that the contact piece of the solid member to be pressed against the name card may catch the name card and cause a damage to the name card when the name card is inserted into the optical reading device or may obstruct such insertion of the name card.

In addition, in the optical reading device described above, since the sensor carrier contacts with an entire outer periphery of the screw shaft, a load to a motor for driving the screw shaft to rotate is high, and if the sensor carrier is stopped from moving by some causes, then there is the possibility that an overload may be applied to the motor and the motor may fail.

SUMMARY OF THE INVENTION

It is an object of the present invention to provide an optical reading device which is capable of being assembled readily and assures stabilization of the distance between a sensor of the reflecting type and a surface of a medium to be read by the sensor.

It is another object of the present invention to provide an optical reading device wherein the distance between a sensor of the reflecting type and a surface of a medium to be read by the sensor is maintained fixed and the reading repeatability is high without causing damage or soil to a medium from which optically recorded information is to be read.

It is a further object of the present invention to provide an optical reading device which is improved in facility in assembly and attains reduction of a load to be applied to a driving means for driving a sensor of the reflecting type to move back and forth.

It is a still further object of the present invention to provide an optical reading device wherein the fluctuation in distance between a sensor of the reflecting type and a surface of a medium to be read by the sensor is minimized to assure a stabilized reading operation and the medium can be fed stably in a direction perpendicular to the reading direction by the sensor.

It is a still another object of the present invention to provide an optical reading device wherein the fluctuation in distance between a sensor of the reflecting type and a surface of a medium to be read by the sensor is minimized to assure stabilized scanning detection of recorded code information on the medium.

It is a yet another object of the present invention to provide an optical reading device wherein the distance between a sensor of the reflecting type and a surface of a medium to be read by the sensor is maintained fixed and the medium can be fed stably even if recorded code information on the medium is detected by scanning while the surface of the medium being read is being pressed by the sensor.

It is a yet further object of the present invention to provide an optical reading device wherein the distance between a sensor of the reflecting type and a surface of a medium to be read by the sensor is maintained fixed and the detecting characteristic of a scanning detecting mechanism including the sensor of the reflecting type is stabilized.

It is a yet further object of the present invention to provide an optical reading device wherein the distance between a sensor of the reflecting type and a surface of a medium to be read by the sensor is maintained fixed and the quantity of high performance parts of a scanning detecting mechanism including the sensor of the reflecting type is minimized.

It is a yet further object of the present invention to provide an optical reading device wherein the distance between a sensor of the reflecting type and a surface of a medium to be read by the sensor is maintained fixed and a reciprocatively moving mechanism for moving the sensor back and forth to effect scanning detection is stabilized.

It is an additional object of the present invention to provide an optical reading device wherein the distance between a sensor of the reflecting type and a surface of a medium to be read by the sensor is maintained fixed and the change of a reading operation with the passage of time is reduced.

In order to attain the objects, according to one aspect of the present invention, there is provided an optical reading device which comprises a holding member having a sensor of the reflecting type carried thereon, a supporting means provided on the holding member in a spaced relationship by a predetermined distance from a location of the sensor, an engaging member supported for pivotal motion by the supporting means, at least one of the engaging member and the holding member having a toothed portion formed thereon, a screw shaft having a spiral groove formed on an outer periphery thereof such that the spiral groove may be meshed by the toothed portion in a direction perpendicular to an axis of pivotal motion of the engaging member, a first driving means for rotating the screw shaft to move the holding member in the opposite directions together with the engaging member along the screw shaft, a medium guiding means for guiding a record medium, on which information to be read by the sensor when the holding member is moved in one or the other direction by the first driving means is optically recorded, in a predetermined plane, a second driving means for feeding the record medium in the predetermined plane in a direction perpendicular to the direction in which the holding member is moved by the first driving means, a guide shaft disposed in parallel to the screw shaft for guiding the sensor when the holding member is moved in one or the other direction, a contact element provided on the holding member for assuring a minimum distance between the sensor and a surface of the record medium to be read by the sensor, and a resilient member disposed between the holding member and the engaging member for urging the holding member and the engaging member with respect to a location at which a guide portion formed either on the holding member or on the engaging member is slidably contacted with the guide shaft such that the contact element of the holding member may be resiliently contacted with a sliding face provided by the record medium or the medium guiding means and the toothed portion on the holding member or the engaging member may be resiliently engaged with the spiral groove of the screw shaft.

With the optical reading device, since the contact element provided on said holding member is resiliently contacted with the sliding face provided by the record medium in the predetermined plane or the medium guiding means, even if there is some error in mounting position of the screw shaft or the guide shaft or else in distance between the screw shaft and the guide shaft, or even if the thickness of the record medium in the predetermined plane is greater or smaller than a standard one, the sensor carried on said holding member can be maintained at a predetermined distance from a read area of the record medium to be read by the sensor. Consequently, a high degree of reliability in reading can be always assured without a high degree of accuracy in assembly, and the facility in assembly is attained. Besides, there is no limitation in thickness of a record medium to be read by the optical reading device.

The toothed portion may be formed in an integral relationship on the engaging member.

Preferably, the reading optical axis of the sensor is maintained at an angle less than 90 degrees with respect to the record medium.

The record medium may be a name card formed from a base member in the form of a flat plate having a surface on which bar code information formed from optically recorded bars and spaces to be read by the sensor is recorded in an area and general information of a character or characters and/or a figure or figures is recorded in an area other than the area in which the bar code information is recorded.

Preferably, the supporting means provided on the holding member and a portion of the holding member at which the holding member is guided by the guide shaft have a pair of cylindrical holes formed in a spaced relationship by a predetermined distance and extending in parallel to each other. A support shaft may extend in parallel to the guide shaft through the cylindrical hole in the holding member and another cylindrical hole formed in the engaging member to support the holding member and the engaging member for pivotal motion relative to each other. The holding member and the engaging member may be held in contact with each other at end faces thereof through which the cylindrical holes are formed in such a manner as to allow pivotal motion of the holding member and the engaging member relative to each other.

The medium guiding means may include a first guide member for guiding a record face of the record medium in the predetermined plane and a second guide member for guiding the reverse face of the record medium, and the sliding face may be a portion of the record face of the record medium which is positioned between the second guide member and the contact element on the holding member. The contact element of the holding member may extend through an opening formed in the first guide member and slide on the record face of the record medium when the holding member is moved by and along the screw shaft. Preferably, the locus of sliding movement of the contact element of the holding member is displaced from the locus of detecting movement of the sensor in the feeding direction of the record medium. Where such displacement is involved, no damage nor soil may be applied to a read area of the record medium to be read by the sensor. Consequently, reading of a high degree of reliability can always be attained.

Preferably, the toothed portion on the holding member or the engaging member is held in meshing engagement under the resilient force of the resilient member with part of an outer periphery of the spiral groove formed in the screw shaft. With the construction, even if there is some error in distance between the axes of the screw shaft and the guide shaft, the toothed portion can be held in meshing engagement with certainty with the spiral groove of the screw shaft, and consequently, the holding member and the engaging member can be moved back and forth smoothly. Besides, the load to a motor for driving the screw shaft to rotate can be reduced.

The optical reading device may further comprise a cam member located in a corresponding relationship to a portion of an optical record face of the record medium on which no information is recorded for contacting with an abutting portion provided on the holding member to pivot the holding member to move the contact element away from the sliding face as the holding member is moved. At the location of the cam, the contact element is thus spaced from the record face of the record medium. Accordingly, there is no possibility that the contact element may disturb feeding of the record medium.

Preferably, the distance from the supporting means to the contact element which contacts with the sliding face is set greater than the distance from the supporting means to the toothed portion which contacts with the spiral groove of the screw shaft. With the construction, the pressing force of the toothed portion of the engaging member against the screw shaft is set greater than the pressing force of the contact element of the holding member against the record medium. Consequently, the driving force of the screw shaft can be transmitted with certainty to the holding member and the engaging member by way of the toothed portion. Besides, a frictional force between the contact element and the record medium upon sliding movement of the former on the latter can be reduced. The engaging member which is supported for pivotal motion by the supporting means may have the toothed portion formed in an integral relationship thereon and have the guide portion formed thereon for being guided by the guide shaft.

The sliding face may be a record face of the medium on which information to be read is recorded, and the position at which the record face and the contact element of the holding member are contacted with each other may be spaced from the location of the guide shaft in the feeding direction of the record medium. With the construction, when the record medium is fed while the contact element on the holding member is held in resilient contact with the record medium, even if the contact element tends to be dragged in the same direction by the record medium around the axis of the guide shaft, the contact element will not press strongly against the record medium. Consequently, feeding of the record medium is not disturbed by the contact element. Preferably, the contact element of the holding member which contacts with the record face of the record medium applies the resilient force from the resilient member to the record medium at an inclinded angle with respect to the feeding direction of the record medium.

The supporting means and the holding member which is supported for rotation by the supporting means may be supported in a coaxial relationship on the guide shaft. With the arrangement, the guide shaft is utilized also as a shaft for providing the axis of pivotal motion to the holding member, and accordingly, the quantity of parts is reduced.

The toothed portion may be formed on an inner periphery of a support shaft member securely mounted in a cylindrical hole formed in the holding member around the axis of pivotal motion of the holding member while engaging member is supported for pivotal motion at a portion of the support shaft member extending from the holding member, and a location at which the guide shaft is slidably contacted with a guide groove formed in the engaging member may serve as a reference position of the resilient force of the resilient member. With the construction, the screw shaft is disposed at the axis of pivotal motion of the holding member and supports the holding member and the engaging member thereon. Accordingly, the guide shaft need not be disposed so as to present a very high degree of accuracy in distance between the axes of the guide shaft and the screw shaft, and smooth feeding of the holding member and the engaging member can be attained readily.

The contact element provided on the holding member may be formed in such a manner as to contact at a plurality of locations with the sliding face at an inclined relationship in the feeding direction of the record medium and the locations of the contact element are connected to each other. With the arrangement, even where the record medium has information recorded over a wide range of the record face thereof to a location proximate an edge, if the contacting locations of the contact element with the record medium have a sufficiently great extent, then there is no possibility that the contact element may be spaced away from the record medium. In this instance, the contact element may be formed in an integral relationship from a same material with the holding member.

The medium guiding means may include a first guide member for guiding a record face of the record medium, a second guide member for guiding the reverse face of the record medium, and a medium pressing means for resiliently pressing the record medium laterally against a face of the first guide member while permitting the record medium to be fed in the plane, and the sliding face for contacting with the contact element of the holding member may be provided by the other face of the first guide member opposing to the sensor. With the construction, the contact element does not slidably move on the record medium and will apply no damage nor soil to the record medium.

In this instance, the medium pressing means may include a medium pressing portion formed on the second guide member for contacting with the reverse face of the record medium, a pivotally supporting mechanism for supporting the second guide member for pivotal motion to move the medium pressing portion toward and away from the record medium, and an urging member for resiliently urging the second guide member with reference to the pivotally supporting mechanism to move the medium pressing portion toward the first guide member.

Alternatively, the optical reading device may further comprise a pressing force canceling mechanism provided at a location outside a preset portion of the range of movement of the contact element of the holding member within which the record medium is read by the sensor for canceling the pressing force of resiliently pressing the medium pressing means against the record medium. With the optical reading device, when the record medium is not being read by the sensor, the second guide plate is spaced away from the first guide plate. Consequently, the record medium can be fed smoothly in the predetermined plane defined by the first and second guide plates.

The pressing force canceling mechanism may include a pair of driving gears located adjacent the opposite ends of the screw shaft for integral rotation with the screw shaft, a pair of driven gears located proximate the driving gears such that each of the driven gears may be brought into meshing engagement with a corresponding one of the driving gears when the holding member is moved to a corresponding end of the range of movement thereof, a pair of canceling cams mounted for individually integral rotation with the driven gears, and a pair of operating elements provided on the second guide member and cooperating with the canceling cams to cancel the pressing operation of the medium pressing means. The optical reading device may additionally comprise a detecting means located adjacent the opposite ends of the range of movement of the contact element formed on the holding member for detecting the holding member, and a controlling means for stopping rotation of the screw shaft in response to detection of the holding member by the detecting means.

The above and other objects, features and advantages of the present invention will become apparent from the following description and the appended claims, taken in conjunction with the accompanying drawings in which like reference characters denote like or equivalent elements.

DETAILED DESCRIPTION OF THE PREFERRED EMBODIMENTS

Figure 1:
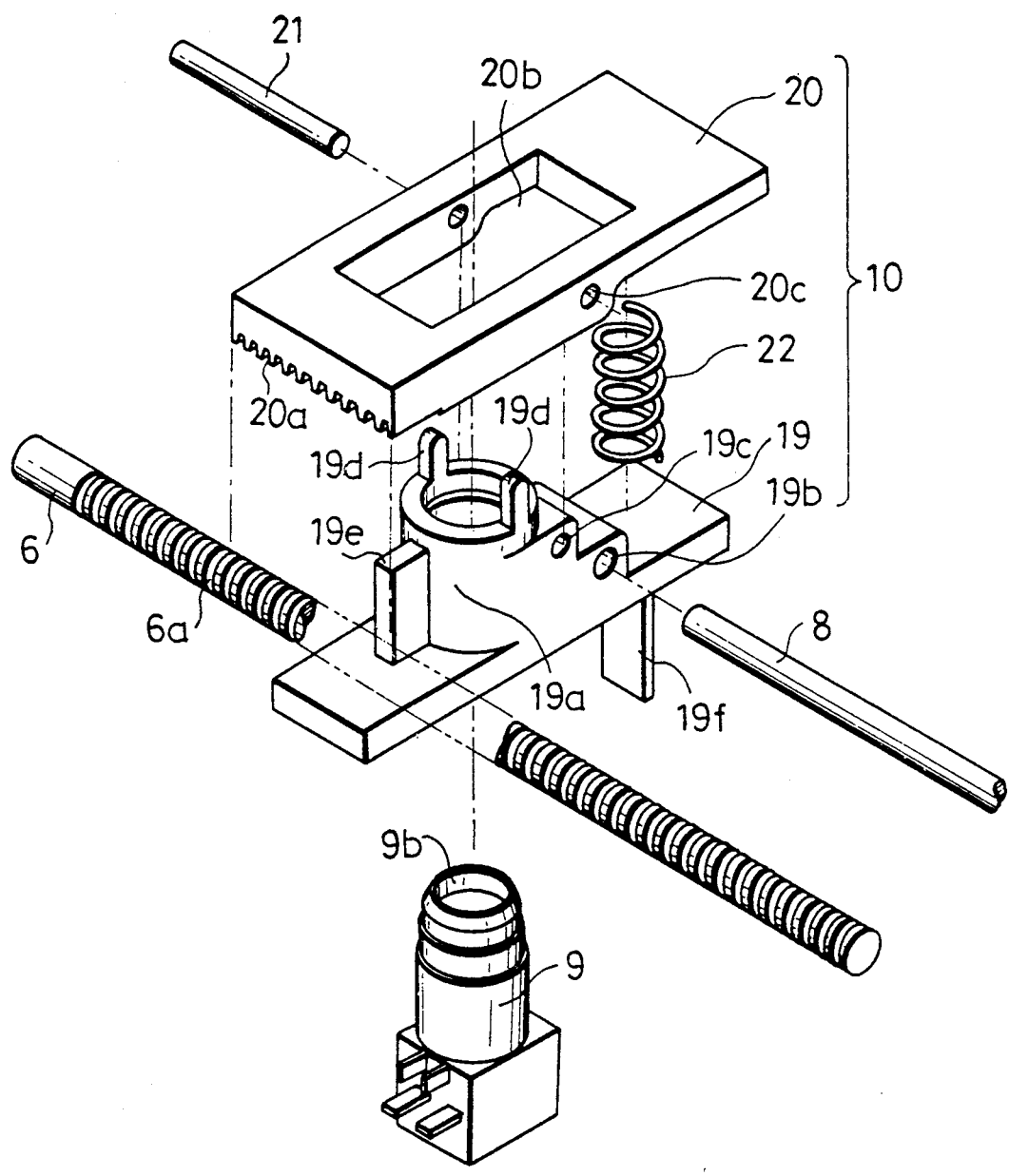
FIG. 1 is a fragmentary perspective view of a sensor carrier of an optical reading device showing a preferred embodiment of the present invention.
Figure 2:
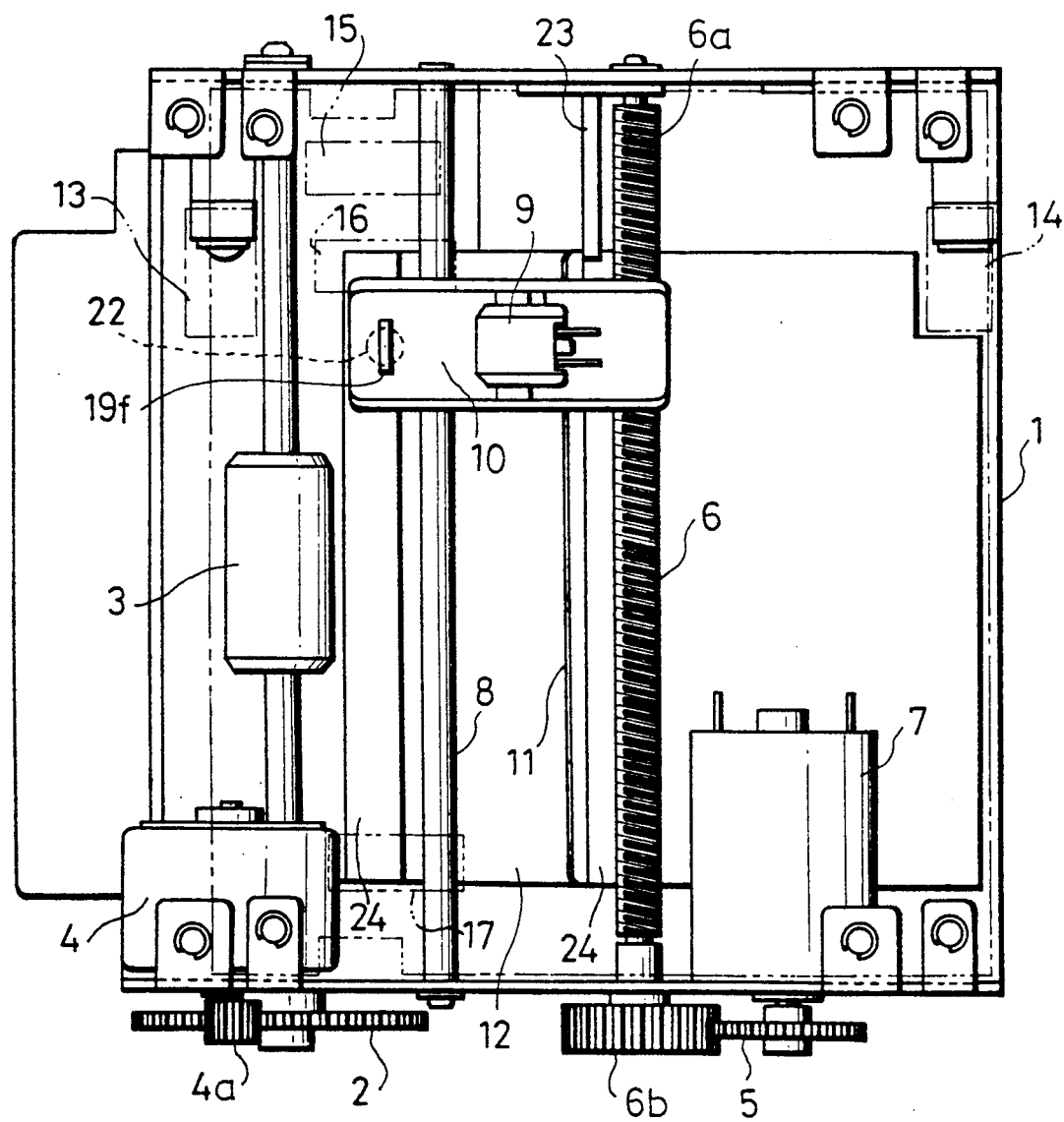
FIG. 2 is a bottom plan view of a mechanism of the optical reading device.
Figure 3:
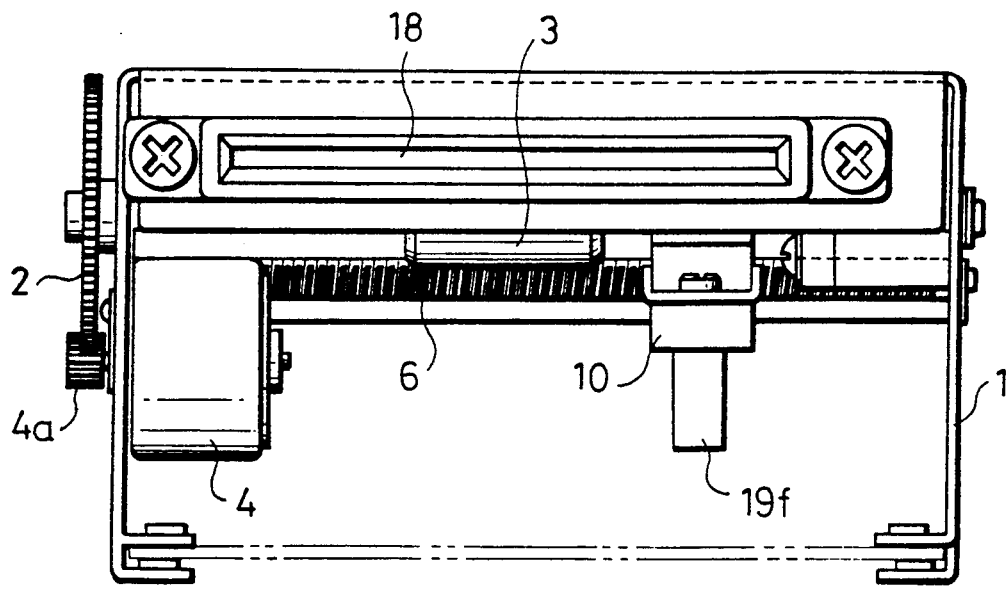
FIG. 3 is a front elevational view of the mechanism shown in FIG. 2.

Referring first to FIGS. 1 to 3, there is shown an optical reading device to which the present invention is applied. The optical reading device shown includes a frame member 1 in which various members or mechanisms are accommodated. Such members or mechanisms include a stepping motor 4 having a drive gear 4a for driving a driving roller 3 to rotate by way of a gear 2, a dc motor 7 for driving a screw shaft 6 having a driven gear 6b to rotate by way of another train 5, a guide shaft 8 extending in parallel to the screw shaft 6, a sensor carrier 10 carrying a bar code sensor 9 thereon and adapted to be moved back and forth in up and down directions in FIG. 2 under the guidance of the screw shaft 6 and the guide shaft 8, an upper name card guide plate 12 exposed in an opening 11 formed in a lower name card guide plate 24 within a range of back and forth movement of a contact piece 19d which is provided on the sensor carrier 10 and will be hereinafter described, and detecting photointerrupters 13, 14, 15, 16 and 17.

The driving roller 3 connected to be driven by the stepping motor 4 is provided to feed an optical record medium in the form of a name card in the leftward and rightward directions in FIG. 2 within the frame member 1, and a driven roller not shown is disposed to cooperate with the driving roller 3. Thus, a name card inserted into the optical reading device through a name card insertion opening 18 is fed at first in the rightward direction in FIG. 2 by the driving roller 3, and after then, the driving roller 3 is rotated reversely to intermittently feed the name card in the leftward direction in FIG. 2. Then, after completion of a reading operation, the name card is discharged from the name card insertion opening 18. The name card which is intermittently fed by suitable control of the the stepping motor 4 is stopped each time one of a plurality of lines of coded bars printed on the rear face of the name card is exposed to the opening 11.

The screw shaft 6 and the guide shaft 8 extend perpendicularly to the feeding direction of the name card inserted in the optical reading device. The screw shaft 6 has a single spiral groove 6a formed on an outer periphery thereof.

Referring particularly to FIG. 1, the sensor carrier 10 includes a holding case 19 having a projected portion 19a formed thereon in which the bar code sensor 9 for detecting reflected light is carried. The holding case 19 further has a perforation 19b formed therein in which the guide shaft 8 is fitted for sliding movement. The sensor carrier 10 further includes an engaging plate 20 having a toothed portion 20a for meshing engagement with the spiral groove 6a of the screw shaft 6 and having a window hole 20b formed therein in which the projected portion 19a of the holding case 19 is fitted. A support shaft 21 extends through another perforation 19c formed in the holding case 19 and a pair of perforations 20c formed in the engaging plate 20 and connects the holding case 19 and the engaging plate 20 for pivotal motion to each other. A coil spring 22 is interposed between the holding case 19 and the engaging plate 20 for urging them in the opposite directions. A pair of contact pieces 19d for resiliently contacting with a name card are formed projectingly at an upper end face of the projected portion 19a of the holding case 19 while an abutting portion 19e for contacting with a cam member which will be hereinafter described is formed projectingly on a side face of the projected portion 19a of the holding case 19. A light interrupting plate 19f is formed on and extends downwardly from the bottom of the holding case 19.

Referring to FIG. 2, a cam member 23 is located adjacent an initial position of the sensor carrier 10, that is, an upper end position in FIG. 2 of the sensor carrier 10. When the sensor carrier 10 is moved to its initial position, the cam member 23 is engaged with the abutting portion 19e of the holding case 19 to pivot the holding case 19 around the axis of the guide shaft 8 against the urging force of the coil spring 22.

Each of the photointerrupters 13 to 17 is an optical sensor of the type which develops an output signal when a light passage between a light emitting element and a light receiving element is interrupted. Thus, the photointerrupter 13 is a sensor for detecting a name card when the name card is inserted into the optical reading device from the outside; the photointerrupter 14 is a sensor for detecting that a name card reaches the most interior position within the frame member 1; the photointerrupter 15 is a sensor for detecting that the sensor carrier 10 is positioned at its initial position; the photointerrupter 16 is a sensor for detecting that the sensor carrier 10 is exposed to a longitudinal end portion of the opening 11; and the photointerrupter 17 is a sensor for detecting that the sensor carrier 10 is exposed to the other longitudinal end portion of the opening 11. The stepping motor 4 and the dc motor 7 are thus controlled in accordance with output signals delivered from the photointerrupters 13 to 17.

Thus, if a name card is inserted into the optical reading device by way of the name card insertion opening 18, the photointerrupter 13 will detect this and develop a signal. The stepping motor 4 is energized in response to the signal, and consequently, the name card is fed toward the most interior position of the frame member 1 by the driving roller 3. When the name card reaches the most interior position, it is detected by the photointerrupter 14, and the driving roller 3 is rotated reversely. Then at a point of time when a first one of a plurality of lines of coded bars on the name card is exposed to the opening 11, the stepping motor 4 is stopped. During such movement of the name card, the sensor carrier 10 remains in a stand-by condition at its initial position at the upper end location of FIG. 2. In this instance, whether or not the sensor carrier 10 is positioned at the initial position is discriminated depending upon whether or not the light interrupting plate 19f of the holding case 19 interrupts a light passage of the photointerrupter 15. Then, after the name card is stopped with the first line of the coded bars thereon exposed to the opening 11, the sensor carrier 10 is moved away from the initial position and then in the longitudinal direction along the opening 11 to read the bar code representation exposed to the opening 11. In this instance, the movement of the sensor carrier 10 from one to the other of the opposite end positions of the opening 11 is detected by successive interruptions of light passages of the photointerrupters 16 and 17 by the light interrupting plate 19f. Then, after completion of the reading operation for the bar code representation of the first line, a stopping signal is delivered to the dc motor 7, and instead, the stepping motor 4 is driven again to feed the name card until the second line of the coded bars on the name card is exposed to the opening 11. A similar sequence of operations is thereafter repeated to successively read the plurality of lines of the bar code representation printed on the reverse face of the name card by means of the bar code sensor 9 carried on the sensor carrier 10.

Figure 4:
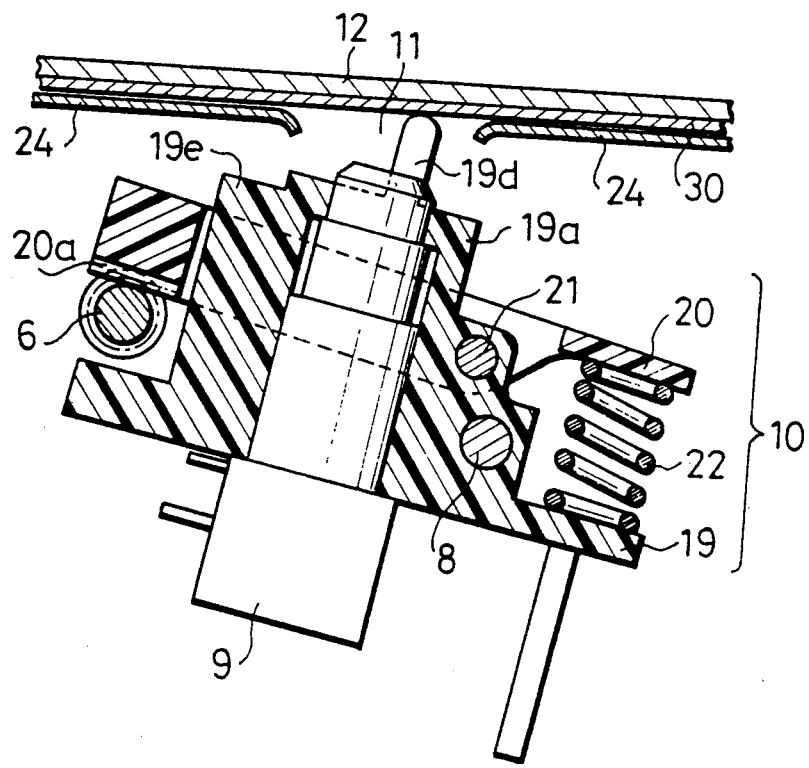
FIG. 4 is a sectional view showing, in an enlarged scale, the sensor carrier of FIG. 1 in a reading condition.

Referring now to FIGS. 4 to 8, the sensor carrier 10 is shown in more detail. Again, a name card 30 inserted into the optical reading device is fed to the position at which a first one of a plurality of lines of coded bars printed on the rear face of the name card 30 is exposed to the opening 11, and then, the screw shaft 6 is driven to rotate so that the sensor carrier 10 is moved linearly from one to the other of a pair of positions adjacent the opposite ends of the opening 11 or vice versa under the guidance of the screw shaft 6 and the guide shaft 8. When the sensor 10 is moved in this manner, the contact pieces 19d of the holding case 19 of the carrier 10 slidably move on the reverse face of the name card 30 because the coil spring 22 urges the holding case 19 around the axis of the guide shaft 8 to resiliently contact the contact pieces 19d of the holding case 19 with the reverse face of the name plate 30 as seen in FIG. 4. Thus, even if there is some error in mounting position of the screw shaft 6 or the guide shaft 8, there is no possibility that the contact pieces 19d may be spaced away from the name card 30 because the holding case 19 is normally urged in the clockwise direction in FIG. 4 around the axis of the guide shaft 8. Accordingly, the distance between a read area $a$ (refer to FIGS. 5 and 6) of the name card 30 upon which a beam 9a of light of the bar code sensor 9 is irradiated to read information thereon and a lens 9b of the bar code sensor 9 is maintained fixed by the contact pieces 19d of the holding case 19. Accordingly, a high degree of reading reliability is assured.

Even where the name card 30 inserted has a thickness greater than a standard one, the distance between the read area $a$ of the name card 30 to be read and the bar code sensor 9 is maintained fixed because the contact pieces 19d are always held in resilient contact with the thicker name card 30 although the holding case 19 is set to a position a little inclined in the counterclockwise direction in FIG. 4.

Figure 5:
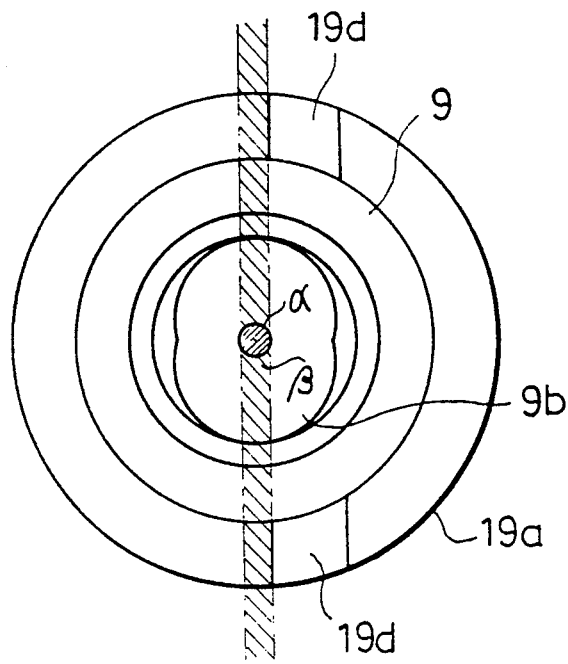
FIG. 5 is a plan view illustrating an area of a medium being read by a sensor on the sensor carrier shown in FIG. 1.
Figure 6:
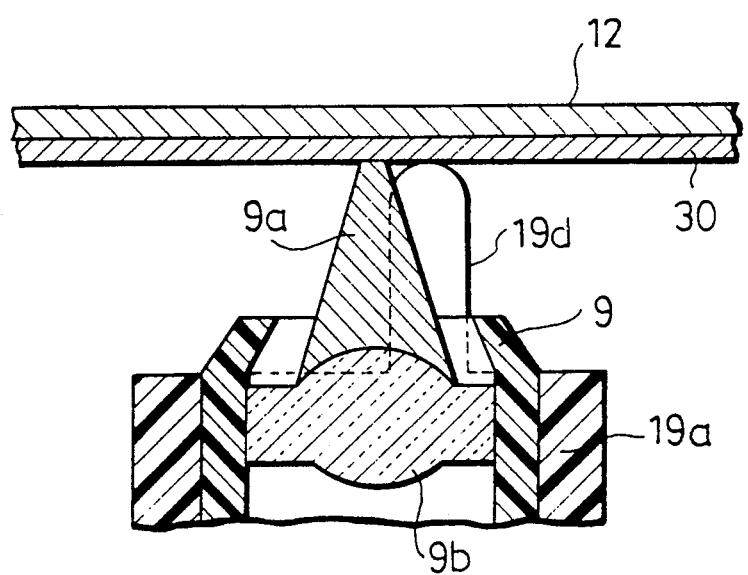
FIG. 6 is a sectional view showing the medium and the sensor shown in FIG. 5.

Further, as particularly seen from FIGS. 5 and 6, the positions of the ends of the contact pieces 19d of the holding case 19 are displaced a little in the feeding direction of the name card 30 (in the rightward direction in FIGS. 5 and 6) from the read area $a$. Or in other words, it is taken into consideration that the locus of the contact pieces 19d when the sensor carrier 10 moves may not overlap with the locus $\beta$ of the bar code sensor 9 for reading. Accordingly, even if the same name card is read repetitively on the optical reading device, the contact pieces 19d will not damage nor soil the read area $a$ of the name card. It is to be noted that the displacement of the ends of the contact pieces 19d from the read area $a$ is preferably restricted to a minimum level because an excessive amount of displacement of the positions of the ends of the contact pieces 19d from the read area $a$ may possibly deteriorate the essential function of stabilizing the distance between the bar code sensor 9 and the read area $a$ of the name card to be read by the bar code sensor 9.

Further, since the coil spring 22 of the sensor carrier 10 normally urges the engaging plate 20 around the support shaft 21 as particularly seen from FIG. 4, the toothed portion 20a of the engaging plate 20 is held in resilient meshing engagement with part of an outer periphery of the screw shaft 6. Accordingly, even if there is some error in distance between the axes of the screw shaft 6 and the guide shaft 8, the toothed portion 20a of the engaging plate 20 is held in meshing engagement with certainty with the spiral groove 6a of the screw shaft 6. Consequently, the sensor carrier 10 can be moved back and forth smoothly along the screw shaft 6 and the guide shaft 8.

Figure 7:
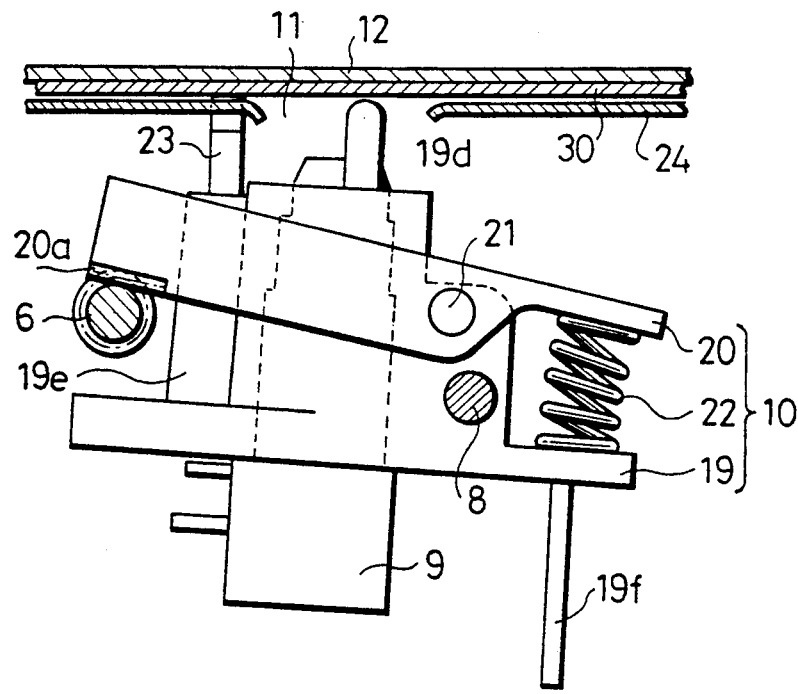
FIG. 7 is a side elevational view showing the sensor carrier of FIG. 1 at its initial position.
Figure 8:
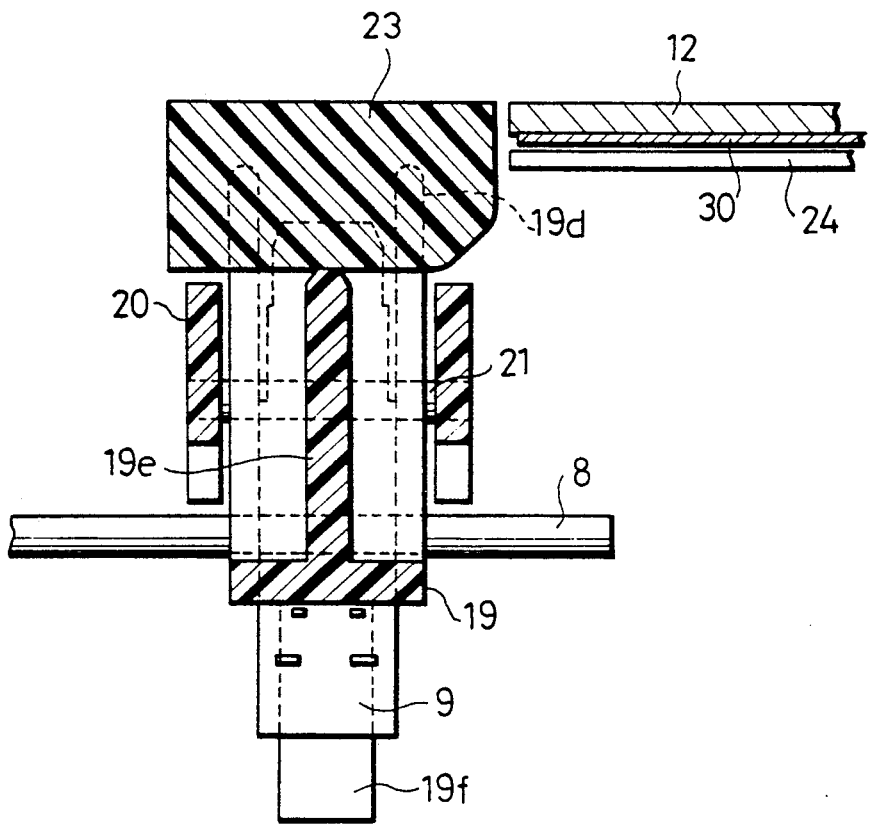
FIG. 8 is a sectional view showing, in an enlarged scale, part of the sensor carrier shown in FIG. 7.

Then, after reading of all of the lines of the code bar representation on the name card 30 is completed, the sensor carrier 10 is moved to its initial position at the uppermost location shown in FIG. 2 whereupon the cam member 23 is engaged with the abutting portion 19e of the holding case 19 to pivot the holding case 19 around the axis of the guide shaft 8 against the urging force of the coil spring 22 as shown in FIGS. 7 and 8. Consequently, the contact pieces 19d are moved down away from the reverse face of the name card 30. After the contact pieces 19d are spaced away from the name card 30 in this manner, the driving roller 3 is rotated to discharge the name card 30 from the name card insertion opening 18.

To the contrary, when the name card 30 is inserted into the optical reading device from the outside in order to start reading thereof, at first the name card 30 is fed to the predetermined position by the driving roller 3, and then the sensor carrier 20 is moved in the rightward direction in FIG. 8 from its initial position shown in FIG. 8. Upon such movement of the sensor carrier 20, the abutting portion 19e of the holding case 19 is disengaged from the cam member 23 so that the contact pieces 19d thereon are resiliently contacted with the reverse face of the name card 30 by the urging force of the coil spring 22. Accordingly, there is no such a trouble that feeding of the name card 30 is obstructed by the contact pieces 19d or the contact pieces 19d are caught and damaged by the name card 30.

In this manner, with the optical reading device of the embodiment described above, after a name card 30 is inserted into the optical reading device from the outside, the contact pieces 19d provided in pair on the holding case 19 are resiliently contacted with the reverse face of the name card 30 by the urging force of the coil spring 22, and the sensor carrier 10 is moved to effect reading of a bar code representation on the name card 30 while the contact pieces 19d are held in resilient contact with the name card 30. Accordingly, the distance between the bar code sensor 9 and the read area α of the name card 30 is maintained fixed, and a high degree of reading reliability can be attained. Consequently, a high degree of accuracy is not required for the mounting position of the screw shaft 6 or the guide shaft 8, which improves the facility in assembly of the optical reading device. Besides, even if the thickness of the name card 30 is differentiated, the distance between the bar code sensor 9 and the read area α is not fluctuated. Accordingly, various kinds of name cards can be read on the optical reading device with a high degree of accuracy.

Besides, since in the embodiment described above the ends of the contact pieces 19d are disposed so that they may not overlap with the reading locus β, there is no possibility that the read area α of the name card 30 may be damaged or soiled by the contact pieces 19d. Consequently, even if the same name card is read repetitively, this will have no bad influence on the name card.

Furthermore, since in the embodiment described above the structure is employed wherein the toothed portion 20a of the engaging plate 20 is held in resilient contact with the circumferential face of the screw shaft 6 by the urging force of the coil spring 22, even if there is some error in distance between the axes of the screw shaft 6 and the guide shaft 8 when they are assembled, the toothed portion 20a will be engaged with certainty with the spiral groove 6a of the screw shaft 6, and consequently, the sensor carrier 10 can be moved back and forth smoothly. Accordingly, the necessity of defining the distance between the axes of the screw shaft 6 and the guide shaft 8 with a high degree of accuracy is eliminated, which results in considerable improvement in facility in assembly. Besides, since the pressing force of the contact pieces 19d against the name card 30 and the pressing force of the toothed portion 20a of the engaging plate 20 against the screw shaft 6 are exerted from the single coil spring 22, the quantity of parts is reduced. In addition, since the toothed portion 20a is held in contact with only part of the outer periphery of the screw shaft 6, the load to the dc motor 7 for driving the screw shaft 6 to rotate is comparatively low. Accordingly, even if the sensor carrier 10 is stopped from moving by some causes, a possible overload to the dc motor 7 can be prevented as the screw shaft 6 is rotated idly.

Further, with the optical reading device of the embodiment described above, if the sensor carrier 10 is moved to its initial position after completion of a predetermined reading operation, the cam member 23 is engaged with the abutting portion 19a of the holding case 19 to pivot the holding case 19 to move the contact pieces 19d of the holding case 19 downwardly away from the reverse face of the name card 30. Consequently, the name card 30 can be inserted into or discharged from the optical reading device while the sensor carrier 10 is held in its stand-by condition at the initial position. Accordingly, there is no possibility that feeding of the name card 30 may be disturbed by the contact pieces 19d and that the contact pieces 19d may be caught and damaged by the name card 30.

Figure 9:
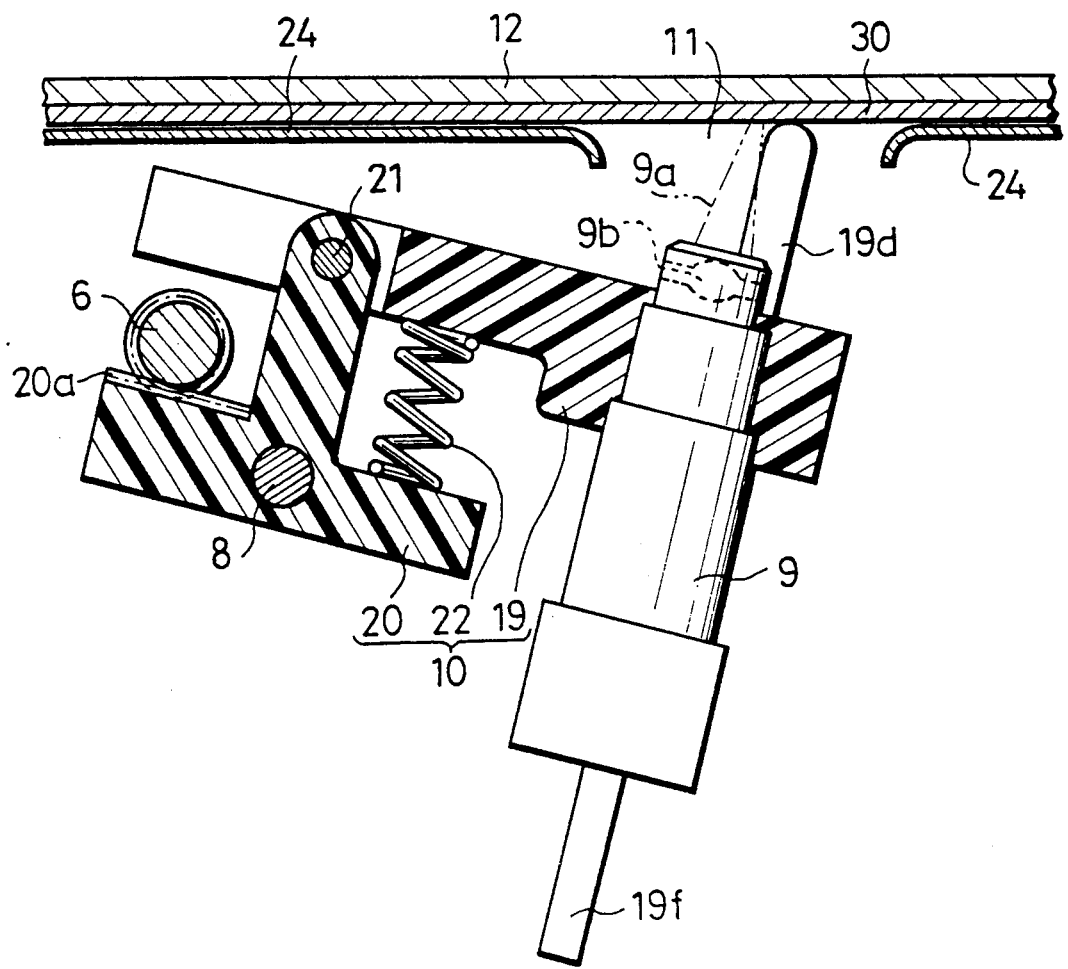
FIG. 9 is a sectional view of a sensor carrier of an optical reading device showing a second preferred embodiment of the present invention.
Figure 10:
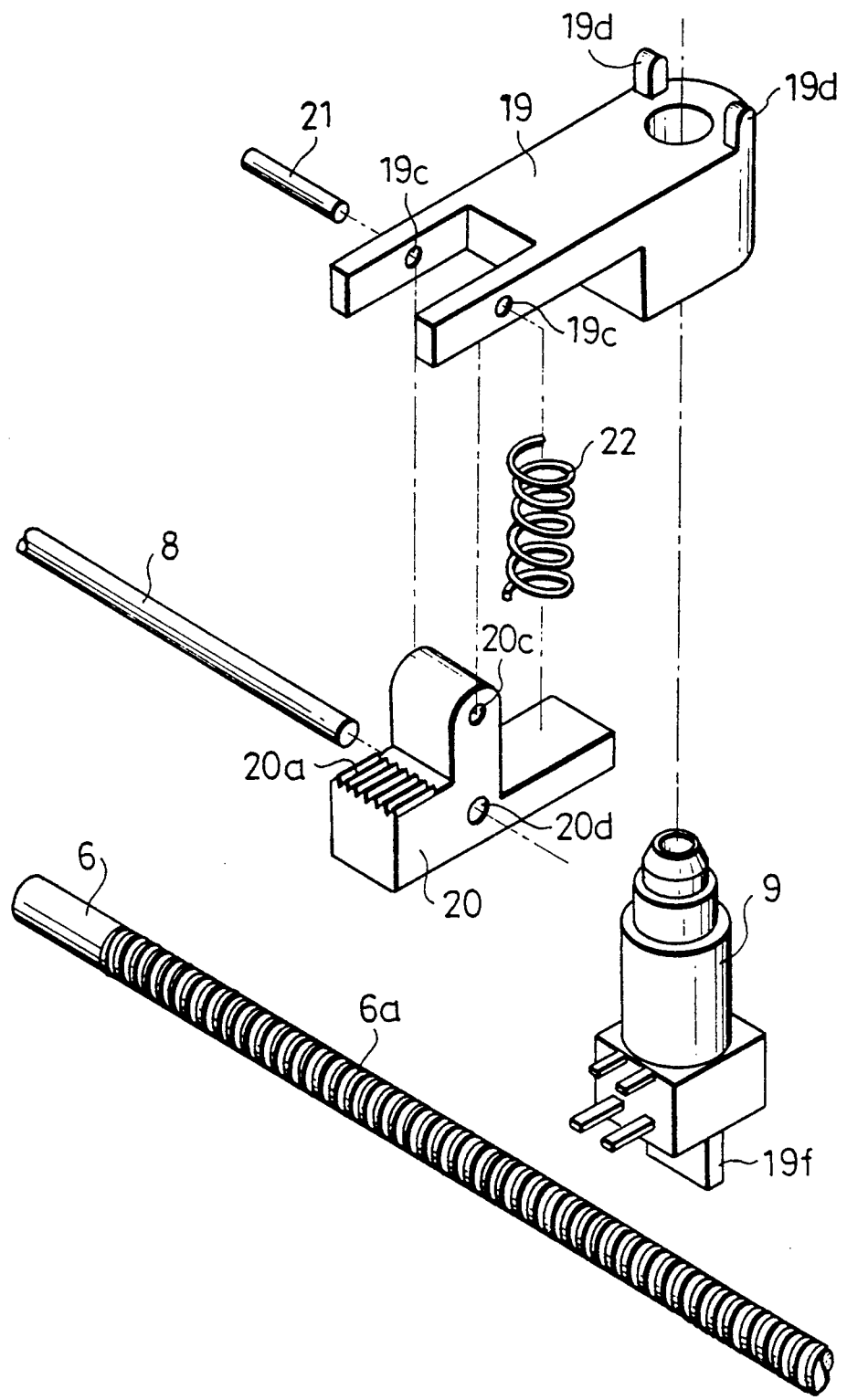
FIG. 10 is a fragmentary perspective view of the sensor carrier of FIG. 9.
Figure 11:
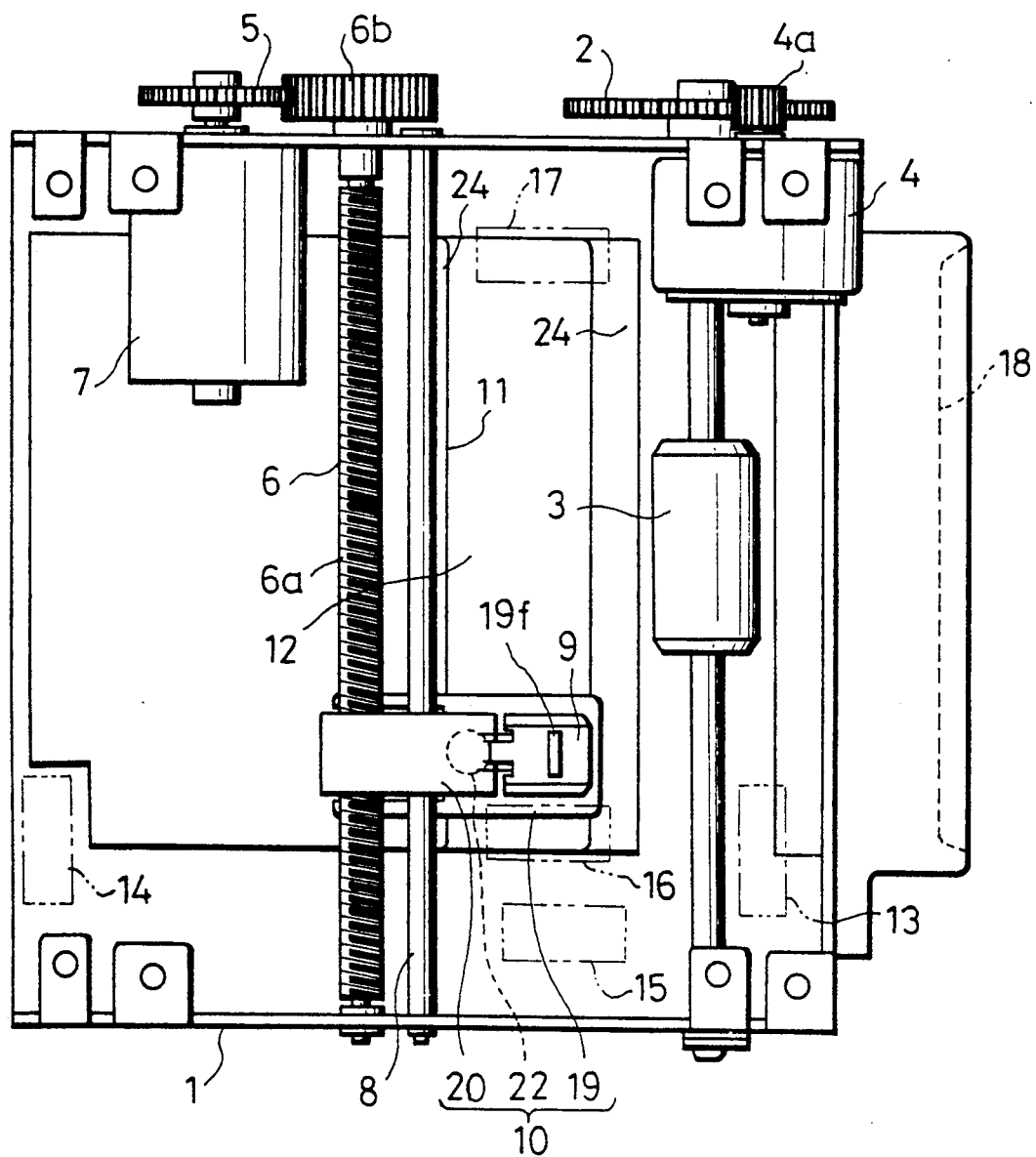
FIG. 11 is a bottom plan view showing a mechanism of the optical reading device in which the sensor carrier of FIG. 9 is incorporated.

Referring now to FIGS. 9 to 11, there is shown an optical reading device according to a second preferred embodiment of the present invention. Referring first to FIG. 11, the optical reading device shown includes a frame member 1 in which various members or mechanisms are accommodated including a stepping motor 4 having a drive gear 4a for driving a driving roller 3 to rotate by way of a gear 2, a dc motor 7 for driving a screw shaft 6 having a driven gear 6b to rotate by way of another gear 5, a guide shaft 8 extending in parallel to the screw shaft 6, a sensor carrier 10 carrying a bar code sensor 9 thereon and adapted to be moved back and forth in up and down directions in FIG. 11 under the guidance of the screw shaft 6 and the guide shaft 8, an upper name card guide plate 12 exposed in an opening 11 formed in a lower name card guide plate 24 within a range of back and forth movement of a contact piece 19d which is provided on the sensor carrier 10 and will be hereinafter described, and detecting photointerrupters 13, 14, 15, 16 and 17.

The driving roller 3 connected to be driven by the stepping motor 4 is provided to feed a name card 30 (refer to FIG. 9) in the leftward and rightward directions in FIG. 11 within the frame member 1, and a driven roller not shown is disposed to cooperate with the driving roller 3. Thus, a name card 30 inserted into the optical reading device through a name card insertion opening 18 is fed at first in the leftward direction in FIG. 11 by the driving roller 3, and after then, the driving roller 3 is rotated reversely to intermittently feed the name card 30 in the rightward direction in FIG. 11. Then, after completion of a reading operation, the name card 30 is discharged from the name card insertion opening 18. The name card 30 which is intermittently fed by suitable control of the stepping motor 4 has characters of a name and/or a figure represented on a surface thereof and is stopped each time one of a plurality of lines of coded bars printed on the rear face of the name card 30 is exposed to the opening 11.

The screw shaft 6 and the guide shaft 8 extend perpendicularly to the feeding direction of the name card 30 inserted in the optical reading device. The screw shaft 6 has a single spiral groove 6a formed on an outer periphery thereof.

As apparently seen from FIGS. 9 and 10, the sensor carrier 10 includes an engaging member 20 having a toothed portion 20a for meshing engagement with the spiral groove 6a of the screw shaft 6 and having a cylindrical hole 20d formed therein in which the guide shaft 8 is fitted for sliding movement. The sensor carrier 10 further includes a holding case 19 carrying the bar code sensor 9 thereon and connected to the engaging member 20 by means of a support shaft 21 which extends through a pair of cylindrical holes 19c formed in the holding case 19 and another cylindrical hole 20c formed in the engaging member 20. A coil spring 22 is interposed between the engaging member 20 and the holding case 19. A pair of contact pieces 19d are formed projectingly at an upper end face of the holding case 19 proximate the bar code sensor 9. The coil spring 22 is located in a substantially symmetrical relationship with the screw shaft 6 on the inside of the bar code sensor 9 with respect to the guide shaft 8 and the support shaft 21. Consequently, the coil spring 22 normally urges the engaging member 20 in the clockwise direction in FIG. 9 around an axis of the guide shaft 8 while it normally urges the holding case 19 in the counterclockwise direction in FIG. 9 around an axis of the support shaft 21. A light interrupting plate 19f for interrupting light passages of the photointerrupters 15 to 17 which will be hereinafter described is formed on and extends downwardly from the bottom of the bar code sensor 9 which is fitted in and securely carried on the holding case 19.

Each of the photointerrupters 13 to 17 is an optical sensor of the type which develops an output signal when a light passage between a light emitting element and a light receiving element is interrupted. Thus, the photointerrupter 13 is a sensor for detecting a name card 30 when the name card 30 is inserted into the optical reading device from the outside; the photointerrupter 14 is a sensor for detecting that the name card 30 reaches the most interior position within the frame member 1; the photointerrupter 15 is a sensor for detecting that the sensor carrier 10 is positioned at its initial position; the photointerrupter 16 is a sensor for detecting that the sensor carrier 10 is exposed to a longitudinal end portion of the opening 11; and the photointerrupter 17 is a sensor for detecting that the sensor carrier 10 is exposed to the other longitudinal end portion of the opening 11. The stepping motor 4 and the dc motor 7 are thus controlled in accordance with output signals delivered from the photointerrupters 13 to 17.

Thus, if a name card 30 is inserted into the optical reading device by way of the name card insertion opening 18, the photointerrupter 13 will detect this and develop a signal. The stepping motor 4 is energized in response to the signal, and consequently, the name card 30 is fed toward the most interior position of the frame member 1 by the driving roller 3. When the name card 30 reaches the most interior position, it is detected by the photointerrupter 14, and the driving roller 3 is rotated reversely. Then at a point of time when a first one of a plurality of lines of coded bars on the name card 30 is exposed to the opening 11, the stepping motor 4 is stopped. During such movement of the name card 30, the sensor carrier 10 remains in a stand-by condition at its initial position at the lower end location of FIG. 11. In this instance, whether or not the sensor carrier 10 is positioned at the initial position at the lower end location in FIG. 11 is discriminated depending upon whether or not the light interrupting plate 19f of the holding case 19 interrupts a light passage of the photointerrupter 15. Then, after the name card 30 is stopped with the first line bar code representation thereon exposed to the opening 11, the sensor carrier 10 is moved away from the initial position and then in the longitudinal direction along the opening 11 to read the bar code representation. In this instance, the movement of the sensor carrier 10 from one end position to the other end position of the opening 11 is detected by successive interruptions of light passages of the photointerrupters 16 and 17 by the light interrupting plate 19f. Thus, after completion of the reading operation for the bar code representation of the first line, a stopping signal is delivered to the dc motor 7, and instead, the stepping motor 4 is driven again to feed the name card 30 until the second line of the bar code representation on the name card 30 is exposed to the opening 11. A similar sequence of operations is thereafter repeated to successively read the plurality of lines of the bar code representation printed on the reverse face of the name card 30 by means of the bar code sensor 9 carried on the sensor carrier 10.

In operation, a name card 30 inserted into the optical reading device is fed to the position at which a first one of a plurality of lines of coded bars printed on the rear face of the name card 30 is exposed to the opening 11, and then, the screw shaft 6 is driven to rotate so that the sensor carrier 10 is moved linearly from one to the other of a pair of positions adjacent the opposite ends of the opening 11 or vice versa under the guidance of the screw shaft 6 and the guide shaft 8. When the sensor 10 is moved in this manner, the contact pieces 19d of the holding case 19 of the carrier 10 slidably move on the reverse face of the name card 30 because the coil spring 22 urges the holding case 19 around the axis of the support shaft 21 to resiliently contact the contact pieces 19d of the holding case 19 with the reverse face of the name plate 30. Thus, even if there is some error in mounting position of the screw shaft 6 or the guide shaft 8, there is no possibility that the contact pieces 19d may be spaced away from the name card 30 because the holding case 19 is normally acted upon by the urging force of the coil spring 22. Accordingly, the distance between a read area of the name card 30 upon which a beam 9a of light of the bar code sensor 9 is irradiated and a lens 9b of the bar code sensor 9 is maintained fixed by the contact pieces 19d.

Further, since the coil spring 22 of the sensor carrier 10 normally urges the engaging member 20 around the axis of the guide shaft 8, the toothed portion 20a of the engaging member 20 is held in resilient meshing engagement with part of an outer periphery of the screw shaft 6. Accordingly, even if there is some error in distance between the axes of the screw shaft 6 and the guide shaft 8, the toothed portion 20a of the engaging member 20 is held in meshing engagement with certainty with the spiral groove 6a of the screw shaft 6. Consequently, the sensor carrier 10 can be moved back and forth smoothly along the screw shaft 6 and the guide shaft 8.

In this manner, with the optical reading device of the embodiment described above, after a name card 30 is inserted into the optical reading device from the outside, the contact pieces 19d provided projectingly on the holding case 19 are resiliently contacted with the reverse face of the name card 30 by the urging force of the coil spring 22, and the sensor carrier 10 is moved to effect reading of a bar code representation on the name card 30 while the contact pieces 19d are held in resilient contact with the name card 30. Accordingly, the distance between the bar code sensor 9 and the read area of the name card 30 is maintained fixed, and a high degree of reading reliability can be attained. Besides, since the guide shaft 8 which provides the center of pivotal motion to the engaging member 20 is positioned near the screw shaft 6 and far from the contact pieces 19d, the spring force applied to the contact pieces 19d is smaller than the spring force applied to the toothed portion 20a of the engaging member 20. Consequently, a frictional force exerted between the name card 30 and the contact pieces 19d is so small that the name card 30 may not be damaged nor soiled upon reading thereof.

Furthermore, since in the embodiment described above the structure is employed wherein the toothed portion 20a of the engaging member 20 is held in resilient contact with the outer periphery of the screw shaft 6 by the urging force of the coil spring 22, even if there is some error in distance between the axes of the screw shaft 6 and the guide shaft 8 when they are assembled, the engagement of the toothed portion 20a with the spiral groove 6a of the screw shaft 6 will be maintained, and consequently, the sensor carrier 10 can be moved back and forth smoothly. Besides, since the spring force applied to the toothed portion 20a of the engaging member 20 is so great that the driving force of the screw shaft 6 may be transmitted with certainty to the sensor carrier 10 by way of the toothed portion 20a of the engaging member 20, there is no necessity of defining the distance between the axes of the screw shaft 6 and the guide shaft 8 with a high degree of accuracy. Consequently, the facility in assembly is improved significantly. Further, if the sensor carrier 10 is stopped from moving by some causes, a possible overload to the dc motor 7 can be prevented as the screw shaft 6 is rotated idly.

It is to be noted that the location of the resilient member is not limited to the specific location in the optical reading device of the embodiment described above, and for example, instead of the coil spring 22, a tension spring may be provided on the left side of the screw shaft 6 of FIG. 9 such that the engaging member 20 and the holding case 21 may be urged by the tension spring.

Figure 12:
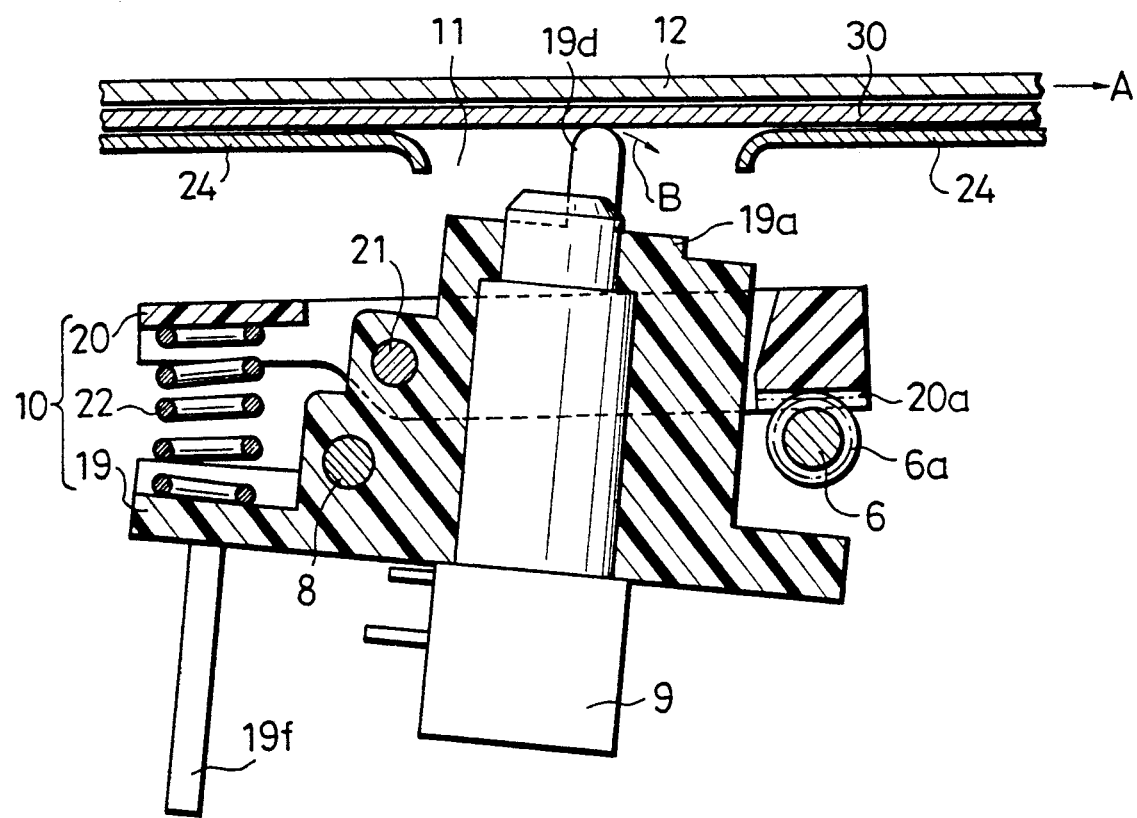
FIG. 12 is a sectional view of a sensor carrier of an optical reading device showing a third preferred embodiment of the present invention.
Figure 13:
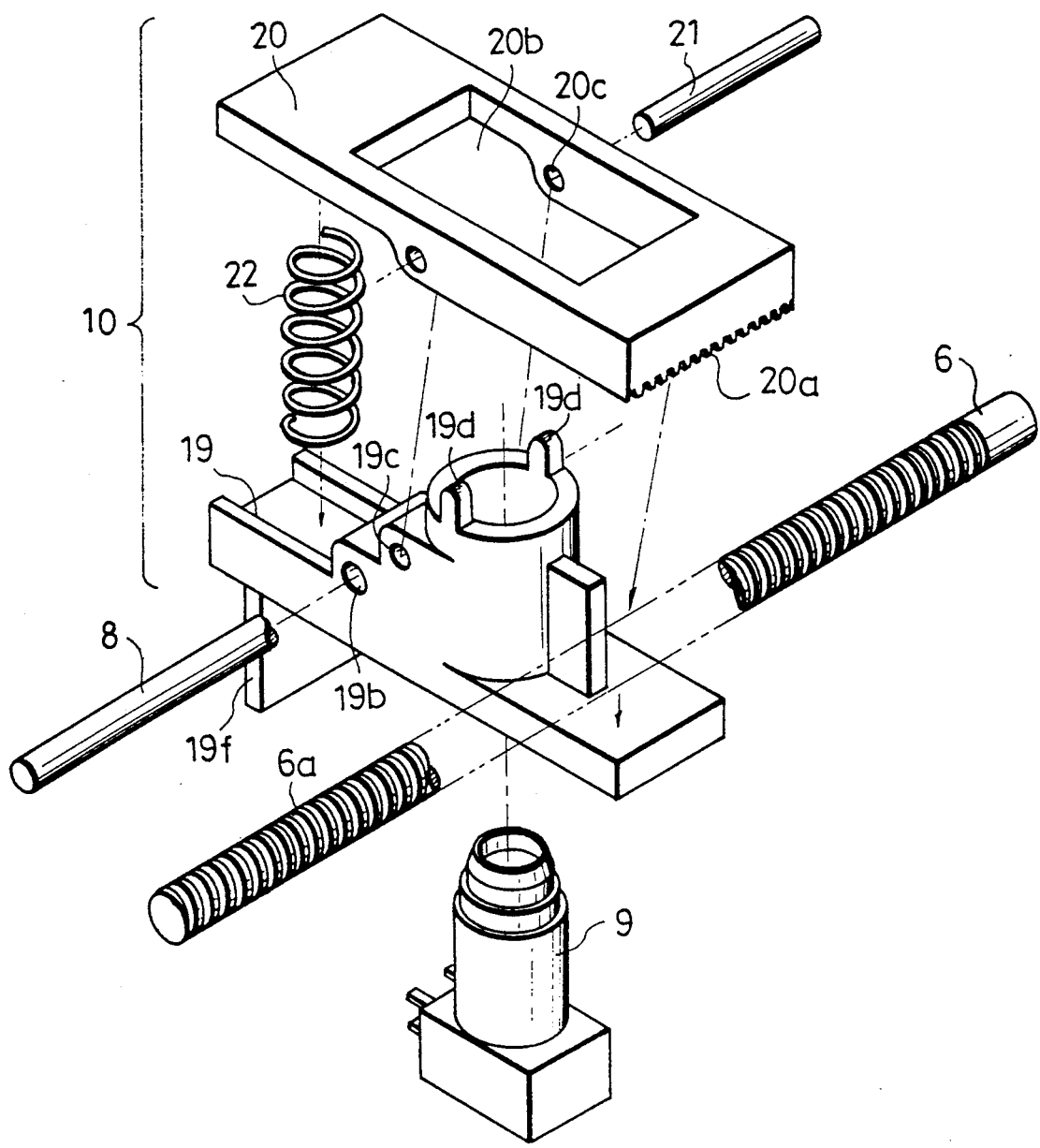
FIG. 13 is fragmentary perspective view of the sensor carrier of FIG. 12.
Figure 14:
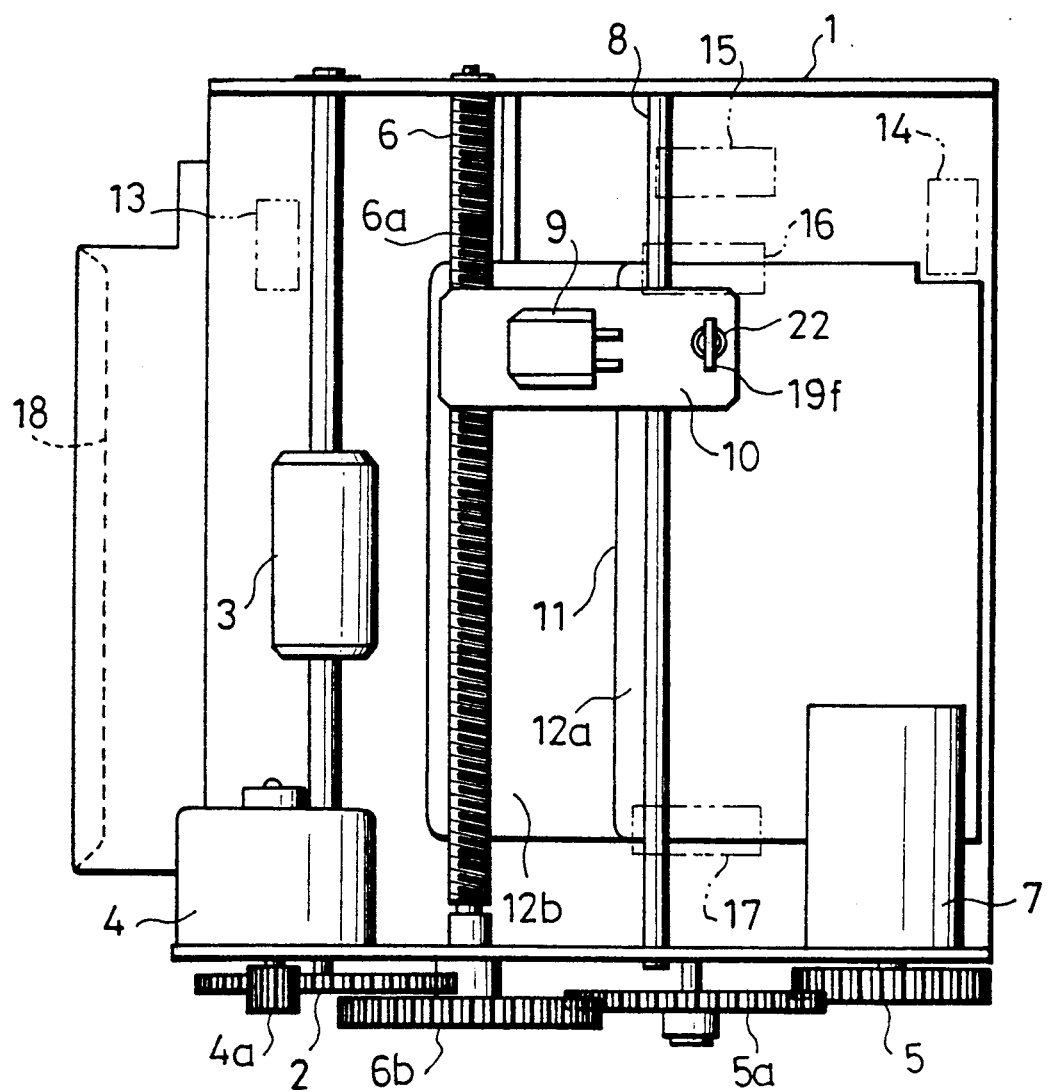
FIG. 14 is a bottom plan view showing a mechanism of the optical reading device in which the sensor carrier of FIG. 12 is incorporated.

Referring now to FIGS. 12 to 14, there is shown an optical reading device according to a third preferred embodiment of the present invention. Referring first to FIG. 14, the optical reading device shown includes a frame member 1 in which various members or mechanisms are accommodated including a stepping motor 4 having a drive gear 4a for driving a driving roller 3 to rotate by way of a gear 2, a dc motor 7 for driving a screw shaft 6 having a driven gear 6b mounted thereon to rotate by way of a drive gear 5 and an intermediate gear 5a, a guide shaft 8 extending in parallel to the screw shaft 6, a sensor carrier 10 carrying a bar code sensor 9 thereon and adapted to be moved back and forth in up and down directions in FIG. 14 under the guidance of the screw shaft 6 and the guide shaft 8, a lower name card guide plate 24 having an opening 11 defined therein, an upper name card guide plate 12b exposed in the opening 11, and detecting photointerrupters 13 to 17.

The driving roller 3 connected to be driven by the stepping motor 4 is provided to feed a name card in the leftward and rightward directions in FIG. 14 within the frame member 1, and a driven roller not shown is disposed to cooperate with the driving roller 3. Thus, a name card inserted into the optical reading device through a name card insertion opening 18 is fed at first in the rightward direction in FIG. 14 by the driving roller 3, and after then, the driving roller 3 is rotated reversely to intermittently feed the name card in the leftward direction in FIG. 14. Then, after completion of a reading operation, the name card is discharged from the name card insertion opening 18. The name card which is intermittently fed by suitable control of the stepping motor 4 is stopped each time one of a plurality of lines of coded bars printed on the rear face of the name card is exposed to the opening 11.

The screw shaft 6 and the guide shaft 8 extend perpendicularly to the feeding direction of the name card inserted in the optical reading device. The screw shaft 6 has a single spiral groove 6a formed on an outer periphery thereof.

As apparently seen from FIGS. 12 and 13, the sensor carrier 10 includes a holding case 19 having a projected portion 19a formed thereon in an inner bore of which the bar code sensor 9 is carried. The holding case 19 further has a perforation 19b formed therein in which the guide shaft 8 is fitted for sliding movement. The sensor carrier 10 further includes an engaging member 20 having a toothed portion 20a for meshing engagement with the spiral groove 6a of the screw shaft 6 and having a window hole 20b formed therein in which the projected portion 19a of the holding case 19 is fitted. A support shaft 21 extends through another perforation 19c formed in the holding case 19 and a pair of perforations 20c formed in the engaging plate 20 and connects the holding case 19 and the engaging member 20 for pivotal motion to each other. A coil spring 22 is interposed between the engaging member 20 and the holding case 19 for urging them in the opposite directions. A pair of contact pieces 19d for resiliently contacting with a name card are formed projectingly at an upper end face of the projected portion 19a of the holding case 19. A light interrupting plate 19f is formed on and extends downwardly from the bottom of the holding case 19.

Each of the photointerrupters 13 to 17 is an optical sensor of the type which develops an output signal when a light passage between a light emitting element and a light receiving element is interrupted. Thus, the photointerrupter 13 is a sensor for detecting a name card when the name card is inserted into the optical reading device from the outside; the photointerrupter 14 is a sensor for detecting that the name card reaches the most interior position within the frame member 1; the photointerrupter 15 is a sensor for detecting that the sensor carrier 10 is positioned at its initial position; the photointerrupter 16 is a sensor for detecting that the sensor carrier 10 is exposed to a longitudinal end portion of the opening 11; and the photointerrupter 17 is a sensor for detecting that the sensor carrier 10 is exposed to the other longitudinal end portion of the opening 11. The stepping motor 4 and the dc motor 7 are thus controlled in accordance with output signals delivered from the photointerrupters 13 to 17.

Thus, when a name card is inserted into the optical reading device by way of the name card insertion opening 18, the photointerrupter 13 will detect this and develop a signal. The stepping motor 4 is energized in response to the signal, and consequently, the name card is fed toward the most interior position of the frame member 1 by the driving roller 3. When the name card reaches the most interior position, it is detected by the photointerrupter 14, and the driving roller 3 is rotated reversely. Then at a point of time when a first one of a plurality of lines of coded bars on the name card is exposed to the opening 11, the stepping motor 4 is stopped. During such movement of the name card, the sensor carrier 10 remains at its initial position at the upper end location of FIG. 14. In this instance, whether or not the sensor carrier 10 is positioned at the initial position at the upper end location in FIG. 14 is discriminated depending upon whether or not the light interrupting plate 19f of the holding case 19 interrupts a light passage of the photointerrupter 15. Then, after the name card is stopped with the first line bar code representation thereon exposed to the opening 11, the sensor carrier 10 is moved away from the initial position and then in the longitudinal direction along the opening 11 to read the first line bar code representation. In this instance, the movement of the sensor carrier 10 from one end position to the other end position of the opening 11 is detected by successive interruptions of light passages of the photointerrupters 16 and 17 by the light interrupting plate 19f. Thus, after completion of the reading operation for the bar code representation of the first line, a stopping signal is delivered to the dc motor 7, and instead, the stepping motor 4 is driven again to feed the name card until the second line of the bar code representation on the name card is exposed to the opening 11. A similar sequence of operations is thereafter repeated to successively read the plurality of lines of the coded bars printed on the reverse face of the name card by means of the bar code sensor 9 carried on the sensor carrier 10.

Referring to FIGS. 12 and 13, in operation, a name card 30 inserted into the optical reading device is fed to the position at which a first one of a plurality of lines of coded bars printed on the rear face of the name card 30 is exposed to the opening 11, and then, the screw shaft 6 is driven to rotate so that the sensor carrier 10 is moved linearly from one to the other of a pair of positions adjacent the opposite ends of the opening 11 or vice versa under the guidance of the screw shaft 6 and the guide shaft 8. When the sensor 10 is moved in this manner, the contact pieces 19d of the holding case 19 of the carrier 10 slidably move on the reverse face of the name card 30 because the coil spring 22 urges the holding case 19 around the axis of the guide shaft 8 to resiliently contact the contact pieces 19d of the holding case 19 with the reverse face of the name plate 30 as shown in FIG. 12. Accordingly, the distance between a read area of the name card 30 upon which a beam of light of the bar code sensor 9 is irradiated and a lens of the bar code sensor 9 is maintained fixed by the contact pieces 19d.

Even where the name card 30 inserted has a thickness greater than a standard one, the distance between a read area of the name card 30 and the bar code sensor 9 is maintained fixed because the contact pieces 19d are always held in resilient contact with the thicker name card 30 although the holding case 19 is set to a position a little inclined in the counterclockwise direction in FIG. 12.

Further, since the coil spring 22 of the sensor carrier 10 normally urges the engaging member 20 around the axis of the support shaft 21, the toothed portion 20a of the engaging member 20 is held in resilient meshing engagement with part of an outer periphery of the screw shaft 6 as apparently seen from FIG. 12. Accordingly, even if there is some error in distance between the axes of the screw shaft 6 and the guide shaft 8, the toothed portion 20a of the engaging member 20 is held in meshing engagement with certainty with the spiral groove 6a of the screw shaft 6. Consequently, the sensor carrier 10 can be smoothly moved back and forth along the screw shaft 6 and the guide shaft 8.

Furthermore, since the name card 30 is fed in its discharging direction (in the direction indicated by an arrow mark A in FIG. 12) while it is held in resilient contact by the contact pieces 19d of the holding case 19, there is the possibility that the contact pieces 19d may be dragged in the direction indicated by an arrow mark B in FIG. 12 due to friction thereof with the name card 30. However, since the direction of such possible displacement of the contact pieces 19d in the direction of the arrow mark B around the axis of the guide shaft 8 coincides with a direction in which the contact pieces 19d are spaced away from the reverse face of the name card 30, there is no possibility that the contact pieces 19d may disturb feeding of the name card 30. In particular, if it is assumed that the locations of the contact pieces 19d with respect to the guide shaft 8 are displaced in the inserting direction of the name card 30, then there is the possibility that the contact pieces 19d which tend to be dragged and displaced by the name card 30 may press strongly against the reverse face of the name card 30 and thus disturb feeding of the name card 30. However, where the locations of the contact pieces 19d with respect to the guide shaft 8 are displaced in the discharging direction of the name card 30, such possible trouble is eliminated.

It is to be noted that, since the contact pieces 19d of the holding case 19 are provided to stabilize the distance between the bar code sensor 9 and a read area of the name card 30 to be read by the bar code sensor 9, when the name card 30 is being fed in the inserting direction while no reading of its bar code representation is performed, the sensor carrier 10 is positioned in a stand-by condition at its initial position at the upper end location of FIG. 14 as described hereinabove, and in this position, the contact pieces 19d of the holding case 19 are held out of contact with the name card 30.

In this manner, with the optical reading device of the embodiment described above, when a bar code representation printed on the reverse face of a name card 30 is to be read, the pair of contact pieces 19d provided projectingly on the holding case 19 are resiliently contacted with the reverse face of the name card 30 by the urging force of the coil spring 22. Accordingly, the distance between the bar code sensor 9 and a read area of the name card 30 is maintained fixed, and a high degree of reading reliability can be attained.

Furthermore, since in the embodiment described above the structure is employed wherein the toothed portion 20a of the engaging member 20 is held in resilient contact with the outer periphery of the screw shaft 6 by the urging force of the coil spring 22, even if there is some error in distance between the axes of the screw shaft 6 and the guide shaft 8 when they are assembled, the engagement of the toothed portion 20a with the spiral groove 6a of the screw shaft 6 will be maintained with certainty, and consequently, the sensor carrier 10 can be moved back and forth smoothly. Accordingly, there is not necessity of defining the distance between the axes of the screw shaft 6 and the guide shaft 8 with a high degree of accuracy. Consequently, the facility in assembly is improved significantly. Further, since the pressing force of the contact pieces 19d against the name card 30 and the pressing force of the toothed portion 20a of the engaging plate 20 against the screw shaft 6 are exerted from the single coil spring 22, the quantity of parts is reduced.

Furthermore, while with the optical reading device of the embodiment described above a bar code representation on a name card 30 is read with the contact pieces 19d held in resilient contact therewith while the name card 30 is intermittently fed in the discharging direction, since the contact pieces 10d are located in a displaced relationship in the discharging direction of the name card 30 with respect to the guide shaft 8 which provides the center of pivotal motion to the holding case 19, even if the contact pieces 19d are dragged and displaced by the name card 30, there is no possibility that the contact pieces 19d may disturb feeding of the name card 30. Besides, since there is no necessity of performing reading of a bar code representation when the name card 30 is fed in the inserting direction, the contact pieces 19d are held out of contact with the name card 30. Accordingly, the name card 30 can be inserted and discharged always smoothly, and there is no possibility that the contact pieces 19d may have a bad influence on the name card 30.

It is to be noted that, while the optical reading device of the embodiment described above employs the structure wherein the toothed portion 20a of the engaging member 20 is resiliently contacted with the circumferential face of the screw shaft 6, another structure may otherwise be employed wherein the screw shaft 6 is fitted for threaded engagement in the engaging member 20. Further, if the holding case 19 and the engaging member 20 are connected for pivotal motion to each other by means of the guide shaft 8, then the support shaft 21 can be omitted. Furthermore, the present invention can be applied also to an optical reading device wherein a bar code representation on a medium such as a name card is read while the medium is intermittently fed in its inserting direction, and in such an instance, the locations of the contact pieces 19d of the holding case 19 with respect to the guide shaft 8 should be displaced in the inserting direction of the medium.

Figure 15:
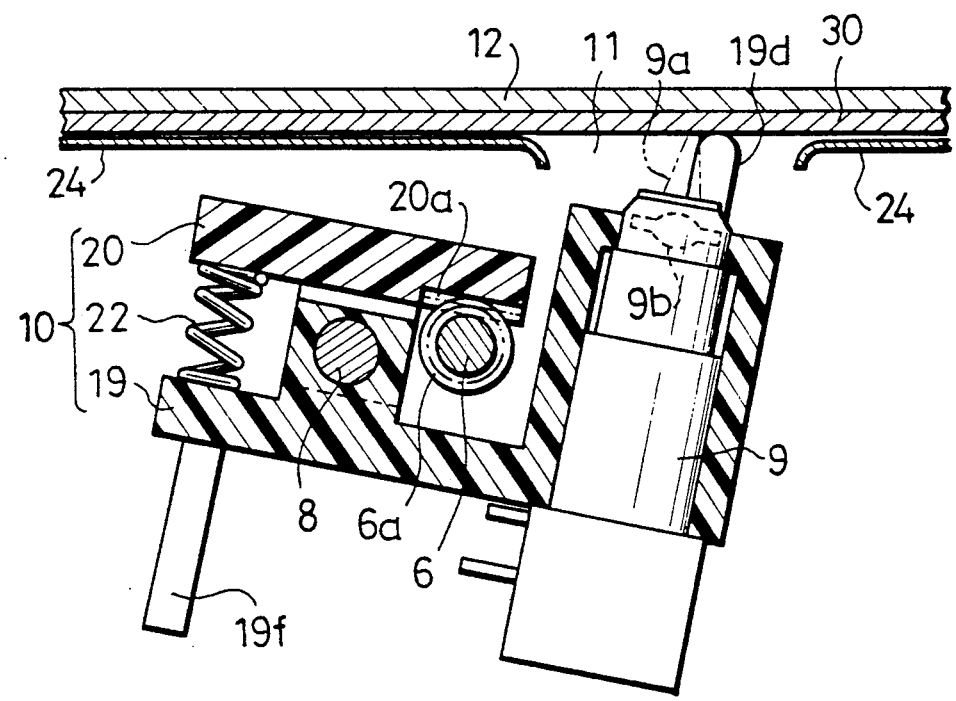
FIG. 15 is a sectional view of a sensor carrier of an optical reading device showing a fourth preferred embodiment of the present invention.
Figure 16:
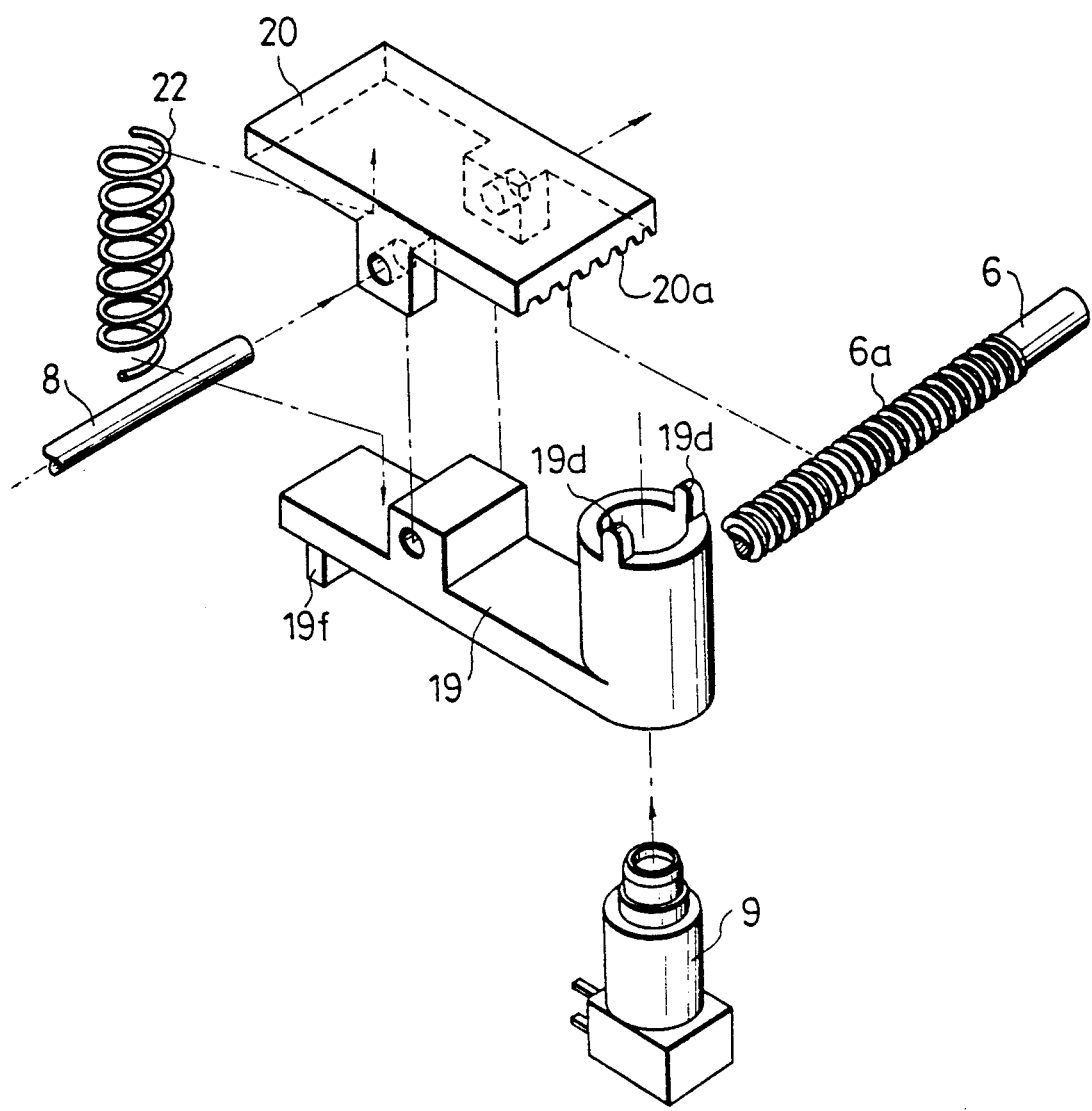
FIG. 16 is a fragmentary perspective view of the sensor carrier of FIG. 15.
Figure 17:
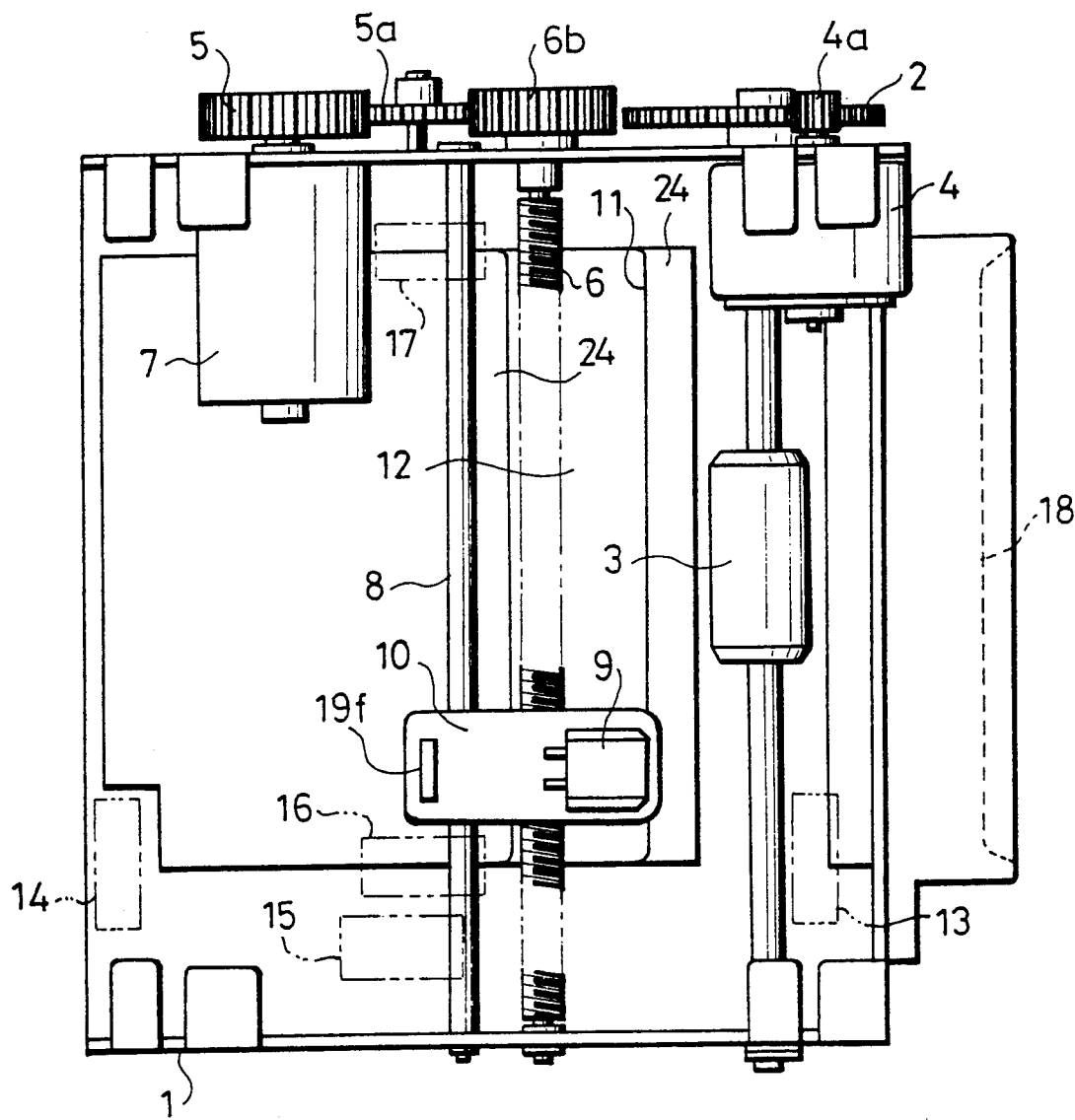
FIG. 17 is a bottom plan view showing a mechanism of the optical reading device in which the sensor carrier of FIG. 15 is incorporated.

Referring now to FIGS. 15 to 17, there is shown an optical reading device according to a fourth preferred embodiment of the present invention. Referring first to FIG. 17, the optical reading device shown includes a frame member 1 in which various members or mechanisms are accommodated including a stepping motor 4 having a drive gear 4a for driving a driving roller 3 to rotate by way of a gear 2, a dc motor 7 for driving a screw shaft 6 having a driven gear 6b mounted thereon to rotate by way of a drive gear 5 and an intermediate gear 5a, a guide shaft 8 extending in parallel to the screw shaft 6, a sensor carrier 10 carrying a bar code sensor 9 thereon and adapted to be moved back and forth in up and down directions in FIG. 17 under the guidance of the screw shaft 6 and the guide shaft 8, a lower name card guide plate 24 having an opening 11 defined therein within a range of back and forth movement of a contact pieces 19d which is provided on the sensor carrier 10 and will be hereinafter described, an upper name card guide plate 12b exposed in the opening 11, and detecting photointerrupters 13 to 17.

The driving roller 3 connected to be driven by the stepping motor 4 is provided to feed a name card 30 (refer to FIG. 15) in the leftward and rightward directions in FIG. 17 within the frame member 1, and a driven roller not shown is disposed to cooperate with the driving roller 3. Thus, a name card 30 inserted into the optical reading device through a name card insertion opening 18 is fed at first in the leftward direction in FIG. 17 by the driving roller 3, and after then, the driving roller 3 is rotated reversely to intermittently feed the name card 30 in the rightward direction in FIG. 17. Then, after completion of a reading operation, the name card 30 is discharged from the name card insertion opening 18. The name card 30 which is intermittently fed by suitable control of the stepping motor 4 is stopped each time one of a plurality of lines of coded bars printed on the rear face of the name card 30 is exposed to the opening 11.

The screw shaft 6 and the guide shaft 8 extend perpendicularly to the feeding direction of the name card 30 inserted in the optical reading device. The screw shaft 6 has a single spiral groove 6a formed on an outer periphery thereof.

As apparently seen from FIGS. 15 and 16, the sensor carrier 10 includes a base member 20 serving as an engaging member having a toothed portion 20a for meshing engagement with the spiral groove 6a of the screw shaft 6 and fitted for sliding movement on the guide shaft 8. The sensor carrier 10 further includes a holding case 19 carrying the bar code sensor 9 thereon and connected for pivotal motion to the base member 20 by means of the guide shaft 8. A coil spring 22 is interposed between the base member 20 and the holding case 19 for urging them in the opposite directions. A pair of contact pieces 19d are formed projectingly at an upper end portion of the holding case 19. The coil spring 22 normally urges the base member 20 in the clockwise direction in FIG. 15 around an axis of the guide shaft 8 while it normally urges the holding case 19 in the counterclockwise direction in FIG. 15. An interrupting plate 19f for interrupting light passages of the photointerrupters 15 to 17 which will be described below is formed on and extends downwardly from the bottom of the holding case 19.

Each of the photointerrupters 13 to 17 is an optical sensor of the type which develops an output signal when a light passage between a light emitting element and a light receiving element is interrupted. Thus, the photointerrupter 13 is a sensor for detecting a name card 30 when the name card 30 is inserted into the optical reading device from the outside; the photointerrupter 14 is a sensor for detecting that the name card 30 reaches the most interior position within the frame member 1; the photointerrupter 15 is a sensor for detecting that the sensor carrier 10 is positioned at its initial position; the photointerrupter 16 is a sensor for detecting that the sensor carrier 10 is exposed to a longitudinal end portion of the opening 11; and the photointerrupter 17 is a sensor for detecting that the sensor carrier 10 is exposed to the other longitudinal end portion of the opening 11. The stepping motor 4 and the dc motor 7 are thus controlled in accordance with output signals delivered from the photointerrupters 13 to 17.

Thus, when a name card 30 is inserted into the optical reading device by way of the name card insertion opening 18, the photointerrupter 13 will detect this and develop a signal. The stepping motor 4 is energized in response to the signal, and consequently, the name card 30 is fed toward the most interior position of the frame member 1 by the driving roller 3. When the name card 30 reaches the most interior position, it is detected by the photointerrupter 14, and the driving roller 3 is rotated reversely. Then at a point of time when a first one of a plurality of lines of coded bars on the name card 30 is exposed to the opening 11, the stepping motor 4 is stopped. During such movement of the name card 30, the sensor carrier 10 remains at its initial position at the lower end location of FIG. 17. In this instance, whether or not the sensor carrier 10 is positioned at the initial position at the lower end location in FIG. 17 is discriminated depending upon whether or not the light interrupting plate 19f of the holding case 19 interrupts a light passage of the photointerrupter 15. Then, after the name card 30 is stopped with the first line bar code representation thereon exposed to the opening 11, the sensor carrier 10 is moved away from the initial position and then in the longitudinal direction along the opening 11 to read the bar code representation. In this instance, the movement of the sensor carrier 10 from one end position to the other end position of the opening 11 is detected by successive interruptions of light passages of the photointerrupters 16 and 17 by the light interrupting plate 19f. Thus, after completion of the reading operation for the bar code representation of the first line, a stopping signal is delivered to the dc motor 7, and instead, the stepping motor 4 is driven again to feed the name card 30 until the second line of the bar code representation on the name card 30 is exposed to the opening 11. A similar sequence of operations is thereafter repeated to successively read the plurality of lines of the coded bars printed on the reverse face of the name card 30 by means of the bar code sensor 9 carried on the sensor carrier 10.

In operation, a name card 30 inserted into the optical reading device is fed to the position at which a first one of a plurality of lines of coded bars printed on the rear face of the name card 30 is exposed to the opening 11, and then, the screw shaft 6 is driven to rotate so that the sensor carrier 10 is moved linearly from one to the other of a pair of positions adjacent the opposite ends of the opening 11 or vice versa under the guidance of the screw shaft 6 and the guide shaft 8. When the sensor 10 is moved in this manner, the contact pieces 19d of the holding case 19 of the carrier 10 slidably move on the reverse face of the name card 30 because the coil spring 22 normally urges the holding case 19 around the axis of the guide shaft 8 to resiliently contact the contact pieces 19d of the holding case 19 with the reverse face of the name plate 30. Thus, even if there is some error in mounting position of the screw shaft 6 or the guide shaft 8, there is no possibility that the contact pieces 19d may be spaced away from the name card 30 because the holding case 19 is normally acted upon by the urging force of the coil spring 22. Accordingly, the distance between a read area of the name card 30 upon which a beam 9a of light of the bar code sensor 9 is irradiated and a lens 9b of the bar code sensor 9 is maintained fixed by the contact pieces 19d.

Even where the name card 30 inserted has a thickness greater than a standard one, the distance between a read area of the name card 30 and the bar code sensor 9 is maintained fixed because the contact pieces 19d are always held in resilient contact with the thicker name card 30 although the holding case 19 is set to a position a little inclined in the clockwise direction in FIG. 15.

Further, since the coil spring 22 of the sensor carrier 10 normally urges the base member 20 around the axis of the guide shaft 8 and the screw shaft 6 and the guide shaft 8 are provided at near locations, the toothed portion 20a of the base member 20 is held in strong resilient meshing engagement with the spiral groove 6a of the screw shaft 6. Accordingly, even if there is some error in distance between the axes of the screw shaft 6 and the guide shaft 8, the toothed portion 20a of the engaging member 20 is held in meshing engagement with certainty with the spiral groove 6a of the screw shaft 6. Consequently, the sensor carrier 10 can be smoothly moved back and forth along the screw shaft 6 and the guide shaft 8.

In this manner, with the optical reading device of the embodiment described above, after a name card 30 is inserted into the optical reading device from the outside, the contact pieces 19d provided projectingly on the holding case 19 are resiliently contacted with the reverse face of the name card 30 by the urging force of the coil spring 22, and the sensor carrier 10 is moved to effect reading of a bar code representation on the name card 30 while the contact pieces 19d are held in contact with the name card 30. Accordingly, the distance between the bar code sensor 9 and the read area of the name card 30 is maintained fixed, and a high degree of reading reliability can be attained.

Further, since in the embodiment described above the guide shaft 8 is utilized as the center of pivotal motion of the base member 19 and the engaging member 20, the number of parts is reduced, and besides since the contact pieces 19d of the base member 19 are set such that they are spaced by a greater distance from the guide shaft 8, a frictional force exerted between the name card 30 and the contact pieces 19d is so small that the name card 30 may not be damaged nor soiled upon reading thereof.

Furthermore, since in the embodiment described above the structure is employed wherein the toothed portion 20a of the base member 20 is held in resilient contact with the spiral groove 6a of the screw shaft 6 by the urging force of the coil spring 22 and besides the screw shaft 6 and the guide shaft 8 are provided at near locations so as to set a great spring force to be applied to the toothed portion 20a of the base member 20, even if there is some error in distance between the axes of the screw shaft 6 and the guide shaft 8 when they are assembled, the engaging relationship of the toothed portion 20a with the spiral groove 6a of the screw shaft 6 will be assured, and consequently, the driving force of the screw shaft 6 can be transmitted with certainty to the sensor carrier 10. Thus, even if the distance between the axes of the screw shaft 6 and the guide shaft 8 is not defined with a high degree of accuracy, the sensor carrier 10 can be moved back and forth smoothly, and consequently, the facility in assembly is improved significantly. Further, if the sensor carrier 10 is stopped from moving by some causes, a possible overload to the dc motor 7 can be prevented as the screw shaft 6 is rotated idly.

Figure 18:
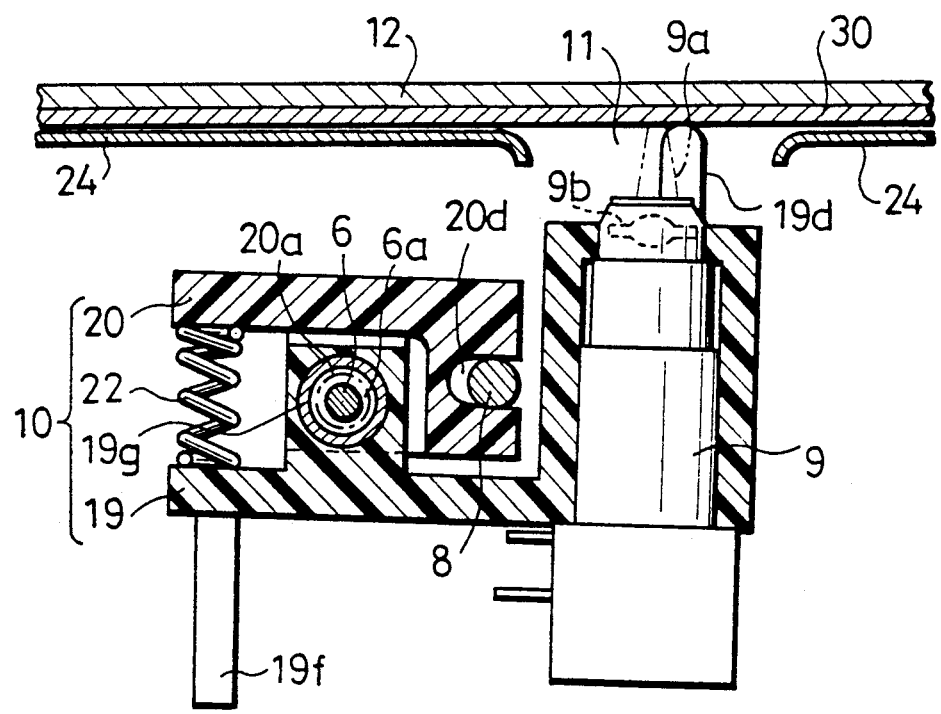
FIG. 18 is a sectional view of a sensor carrier of an optical reading device showing a fifth preferred embodiment of the present invention.
Figure 19:
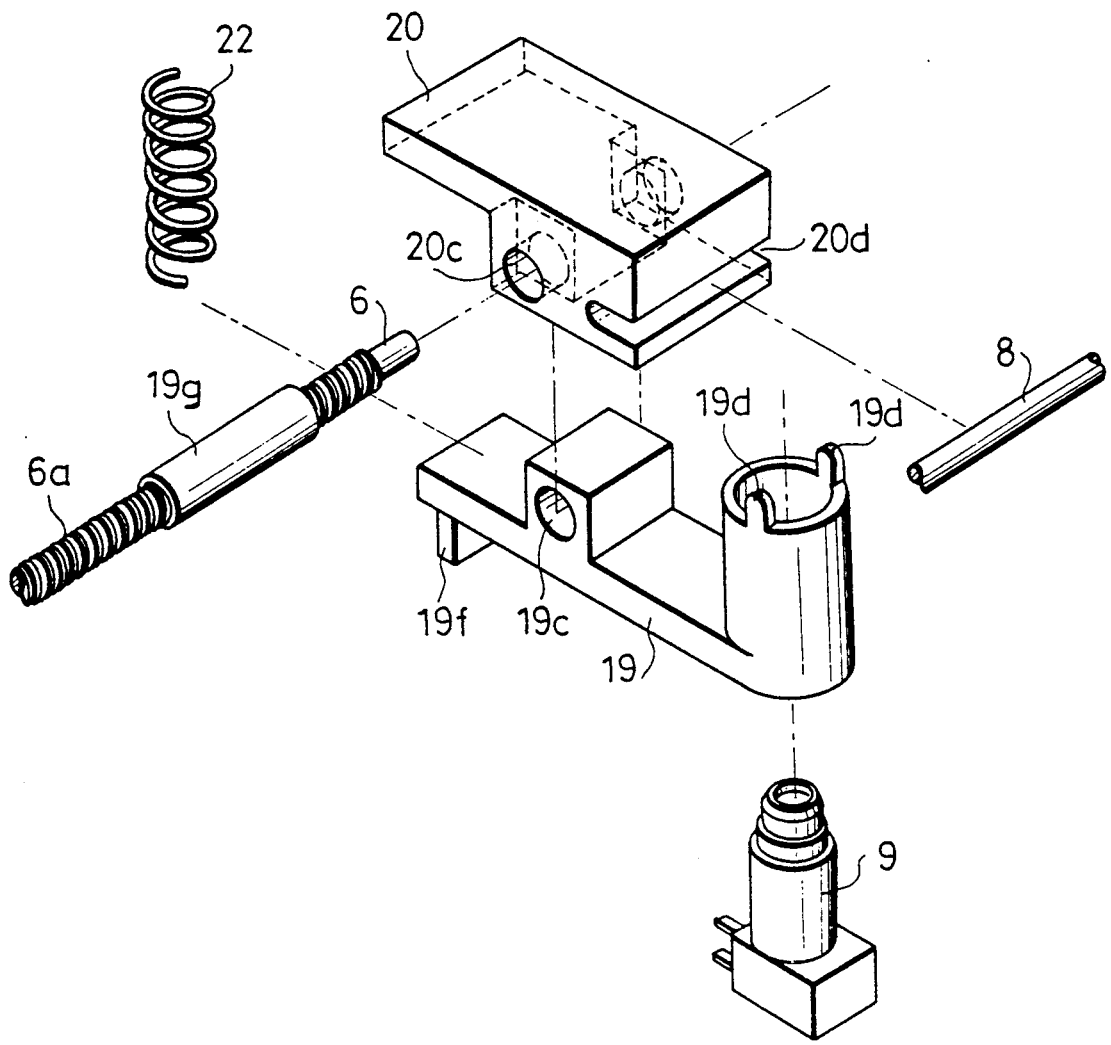
FIG. 19 is a fragmentary perspective view of the sensor carrier of FIG. 18.
Figure 20:
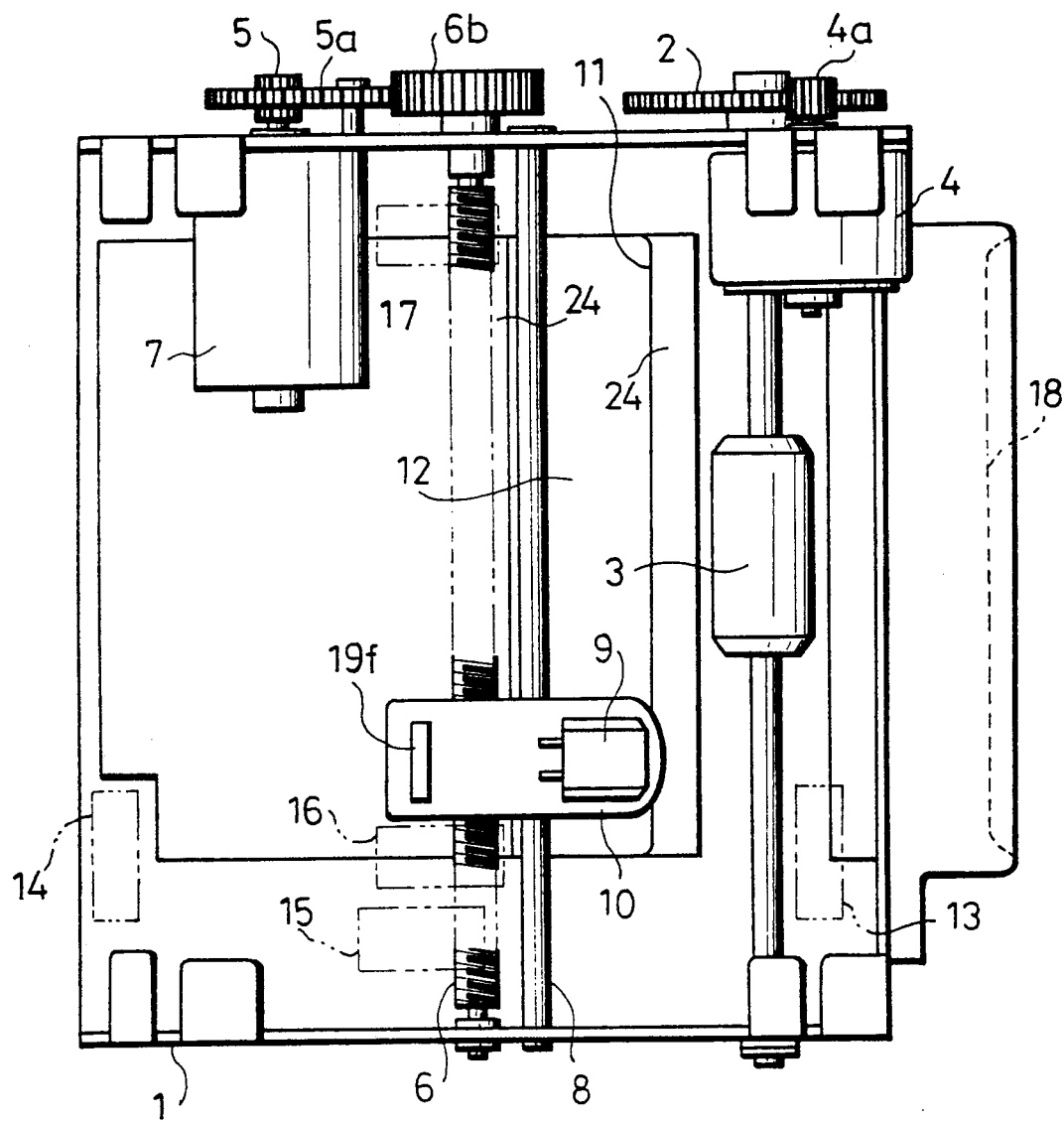
FIG. 20 is a bottom plan view showing a mechanism of the optical reading device in which the sensor carrier of FIG. 18 is incorporated.

Referring now to FIGS. 18 to 20, there is shown an optical reading device according to a fifth preferred embodiment of the present invention. Referring first to FIG. 20, the optical reading device shown includes a frame member 1 in which various members or mechanisms are accommodated including a stepping motor 4 having a drive gear 4a for driving a driving roller 3 to rotate by way of a gear 2, a dc motor 7 for driving a screw shaft 6 having a driven gear 6b mounted thereon to rotate by way of a drive gear 5 and an intermediate gear 5a, an auxiliary shaft 8 extending substantially in parallel to the screw shaft 6, a sensor carrier 10 carrying a bar code sensor 9 thereon and adapted to be moved back and forth in up and down directions in FIG. 20 under the guidance of the screw shaft 6, a lower name card guide plate 24 having an opening 11 defined therein within a range of back and forth movement of a contact piece 19d which is provided on the sensor carrier 10 and will be hereinafter described, an upper name card guide plate 12b exposed in the opening 11, and detecting photointerrupters 13 to 17.

The driving roller 3 connected to be driven by the stepping motor 4 is provided to feed a name card 30 (refer to FIG. 18) in the leftward and rightward directions in FIG. 20 within the frame member 1, and a driven roller not shown is disposed to cooperate with the driving roller 3. Thus, a name card 30 inserted into the optical reading device through a name card insertion opening 18 is fed at first in the leftward direction in FIG. 20 by the driving roller 3, and after then, the driving roller 3 is rotated reversely to intermittently feed the name card 30 in the rightward direction in FIG. 20. Then, after completion of a reading operation, the name card 30 is discharged from the name card insertion opening 18. The name card 30 which is intermittently fed by suitable control of the stepping motor 4 is stopped each time one of a plurality of lines of coded bars printed on the rear face of the name card 30 is exposed to the opening 11.

The screw shaft 6 extends perpendicularly to the feeding direction of the name card 30 inserted in the optical reading device. The screw shaft 6 has a single spiral groove 6a formed on an outer periphery thereof.

The auxiliary shaft 8 is provided to prevent pivotal motion of a base member of the sensor carrier 10 which serves as an engaging member described below.

As apparently seen from FIGS. 18 and 19, the sensor carrier 10 includes a hollow cylindrical support shaft 19g having a threaded portion 20a formed on an inner wall thereof for meshing engagement with the spiral groove 6a of the screw shaft 6. The sensor carrier 10 further includes a base member 20 serving as an engaging member having a U-shaped groove 20d formed therein for loosely fitting with the auxiliary shaft 8. The base member 20 further has a through-hole 20c formed therein in which the support shaft 19g is securely press fitted. The sensor carrier 10 further includes a holding case 19 carrying the bar code sensor 9 thereon and having a pair of contact pieces 19d formed projectingly at an upper end portion thereof. The holding case 19 has a through-hole 19c formed therein. The through-hole 19c has a greater diameter than the through-hole 20c of the base member 20, and the support shaft 19g are loosely fitted in the through-hole 19c. The holding case 19 is connected for pivotal motion to the base member 20 by means of the support shaft 19g, and a coil spring 22 normally urges the holding case 19 in the counterclockwise direction in FIG. 18 around an axis of the support shaft 19g. The base member 20 is stopped from pivotal motion by the auxiliary shaft 8, and when the screw shaft 6 is rotated, the base member 20 is driven by the screw shaft 6 to move in a direction perpendicular to the plane of FIG. 18, that is, in up and down directions in FIG. 20. An interrupting plate 19f for interrupting light passages of the photointerrupters 15 to 17 which will be described below is formed on and extends downwardly from the bottom of the holding case 19.

Each of the photointerrupters 13 to 17 is an optical sensor of the type which develops an output signal when a light passage between a light emitting element and a light receiving element is interrupted. Thus, the photointerrupter 13 is a sensor for detecting a name card 30 when the name card 30 is inserted into the optical reading device from the outside; the photointerrupter 14 is a sensor for detecting that the name card 30 reaches the most interior position within the frame member 1; the photointerrupter 15 is a sensor for detecting that the sensor carrier 10 is positioned at its initial position; the photointerrupter 16 is a sensor for detecting that the sensor carrier 10 is exposed to a longitudinal end portion of the opening 11; and the photointerrupter 17 is a sensor for detecting that the sensor carrier 10 is exposed to the other longitudinal end portion of the opening 11. The stepping motor 4 and the dc motor 7 are thus controlled in accordance with output signals delivered from the photointerrupters 13 to 17.

Thus, when a name card 30 is inserted into the optical reading device by way of the name card insertion opening 18, the photointerrupter 13 will detect this and develop a signal. The stepping motor 4 is energized in response to the signal, and consequently, the name card 30 is fed toward the most interior position of the frame member 1 by the driving roller 3. When the name card 30 reaches the most interior position, it is detected by the photointerrupter 14, and the driving roller 3 is rotated reversely. Then at a point of time when a first one of a plurality of lines of coded bars on the name card 30 is exposed to the opening 11, the stepping motor 4 is stopped. During such movement of the name card 30, the sensor carrier 10 remains at its initial position at the lower end location of FIG. 20. In this instance, whether or not the sensor carrier 10 is positioned at the initial position at the lower end location in FIG. 20 is discriminated depending upon whether or not the light interrupting plate 19f of the holding case 19 interrupts a light passage of the photointerrupter 15. Then, after the name card 30 is stopped with the first line bar code representation thereon exposed to the opening 11, the sensor carrier 10 is moved away from the initial position and then in the longitudinal direction along the opening 11 to read the bar code representation. In this instance, the movement of the sensor carrier 10 from one end position to the other end position of the opening 11 is detected by successive interruptions of light passages of the photointerrupters 16 and 17 by the light interrupting plate 19f. Thus, after completion of the reading operation for the bar code representation of the first line, a stopping signal is delivered to the dc motor 7, and instead, the stepping motor 4 is driven again to feed the name card 30 until the second line of the bar code representation on the name card 30 is exposed to the opening 11. A similar sequence of operations is thereafter repeated to successively read the plurality of lines of the coded bars printed on the reverse face of the name card 30 by means of the bar code sensor 9 carried on the sensor carrier 10.

In operation, a name card 30 inserted into the optical reading device is fed to the position at which a first one of a plurality of lines of coded bars printed on the rear face of the name card 30 is exposed to the opening 11, and then, the screw shaft 6 is driven to rotate so that the sensor carrier 10 is moved linearly from one to the other of a pair of positions adjacent the opposite ends of the opening 11 or vice versa. When the sensor 10 is moved in this manner, the contact pieces 19d of the holding case 19 of the carrier 10 slidably move on the reverse face of the name card 30 because the coil spring 22 normally urges the holding case 19 around the axis of the support shaft 19g to resiliently contact the contact pieces 19d of the holding case 19 with the reverse face of the name plate 30. Thus, even if there is some error in mounting position of the screw shaft 6, there is no possibility that the contact pieces 19d may be spaced away from the name card 30 because the holding case 19 is normally acted upon by the urging force of the coil spring 22. Accordingly, the distance between a read area of the name card 30 upon which a beam 9a of light of the bar code sensor 9 is irradiated and a lens 9b of the bar code sensor 9 is maintained fixed by the contact pieces 19d.

Even where the name card 30 inserted has a thickness greater than a standard one, the distance between a read area of the name card 30 and the bar code sensor 9 is maintained fixed because the contact pieces 19d are always held in resilient contact with the thicker name card 30 although the holding case 19 is set to a position a little inclined in the clockwise direction in FIG. 18.

In this manner, with the optical reading device of the embodiment described above, after a name card 30 is inserted into the optical reading device from the outside, the contact pieces 19d provided projectingly on the holding case 19 are resiliently contacted with the reverse face of the name card 30 by the urging force of the coil spring 22, and the sensor carrier 10 is moved to effect reading of a bar code representation on the name card 30 while the contact pieces 19d are held in contact with the name card 30. Accordingly, the distance between the bar code sensor 9 and the read area of the name card 30 is maintained fixed, and a high degree of reading reliability can be attained.

Further since in the embodiment described above the screw shaft 6 is disposed at the center of pivotal motion of the holding case 19 and supports the entire sensor carrier 10 thereon, the function of accurately guiding the sensor carrier 10 is not required for the auxiliary shaft 8. Accordingly, even if the dimensional accuracy and/or the positional accuracy of the auxiliary shaft 8 and/or the U-shaped groove 20d are comparatively rough, the sensor carrier 10 can be moved back and forth always smoothly along the screw shaft 6. Accordingly, the workability and the facility in assembly are improved.

Figure 23:
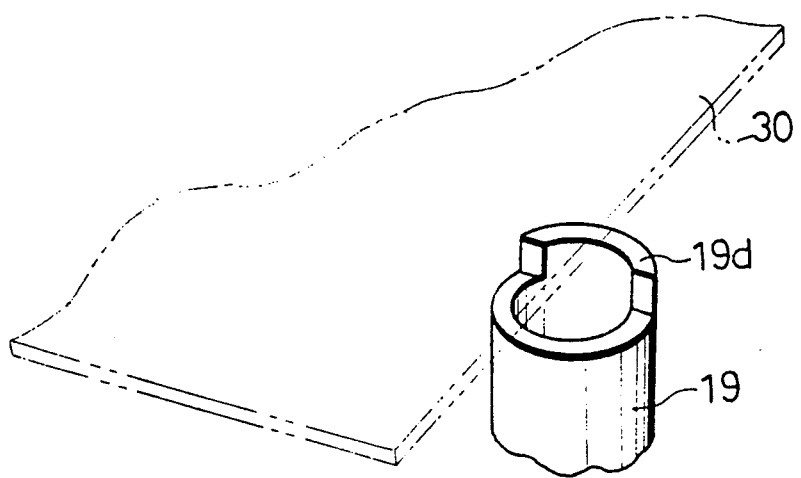
FIG. 23 is a perspective view of the sensor carrier of FIG. 21 in an operative condition.
Figure 24:
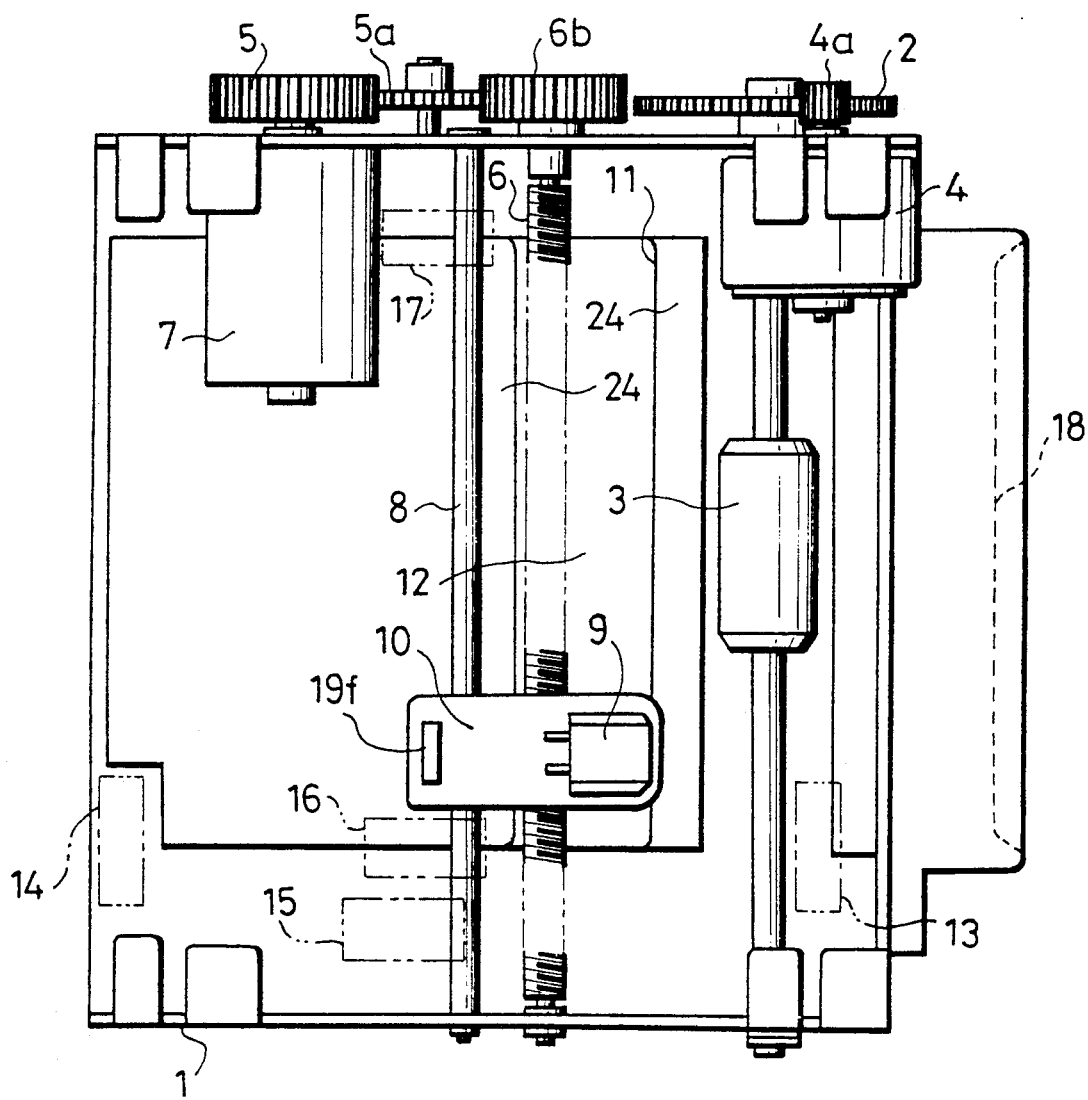
FIG. 24 is a bottom plan view showing a mechanism of the optical reading device in which the sensor carrier of FIG. 21 is incorporated.

Referring now to FIGS. 21 to 24, there is shown an optical reading device according to a sixth preferred embodiment of the present invention. Referring first to FIG. 24, the optical reading device shown includes a frame member 1 in which various members or mechanisms are accommodated including a stepping motor 4 having a drive gear 4a for driving a driving roller 3 to rotate by way of a gear 2, a dc motor 7 for driving a screw shaft 6 having a driven gear 6b mounted thereon to rotate by way of a drive gear 5 and an intermediate gear 5a, a guide shaft 8 extending in parallel to the screw shaft 6, a sensor carrier 10 carrying a bar code sensor 9 thereon and adapted to be moved back and forth in up and down directions in FIG. 24 under the guidance of the screw shaft 6 and the guide shaft 8, a lower name card guide plate 24 having an opening 11 formed therein within a range of back and forth movement of a contact pieces 19d which is provided on the sensor carrier 10 and will be hereinafter described, an upper name card guide plate 12 exposed in the opening 11, and detecting photointerrupters 13 to 17.

The driving roller 3 connected to be driven by the stepping motor 4 is provided to feed a name card 30 (refer to FIG. 21) in the leftward and rightward directions in FIG. 24 within the frame member 1, and a driven roller not shown is disposed to cooperate with the driving roller 3. Thus, a name card 30 inserted into the optical reading device through a name card insertion opening 18 is fed at first in the leftward direction in FIG. 24 by the driving roller 3, and after then, the driving roller 3 is rotated reversely to intermittently feed the name card 30 in the rightward direction in FIG. 24. Then, after completion of a reading operation, the name card 30 is discharged from the name card insertion opening 18. The name card 30 which is intermittently fed by suitable control of the stepping motor 4 is stopped each time one of a plurality of lines of coded bars printed on the rear face of the name card 30 is exposed to the opening 11.

The screw shaft 6 and the guide shaft 8 extend perpendicularly to the feeding direction of the name card 30 inserted in the optical reading device. The screw shaft 6 has a single spiral groove 6a formed on an outer periphery thereof.

Figure 21:
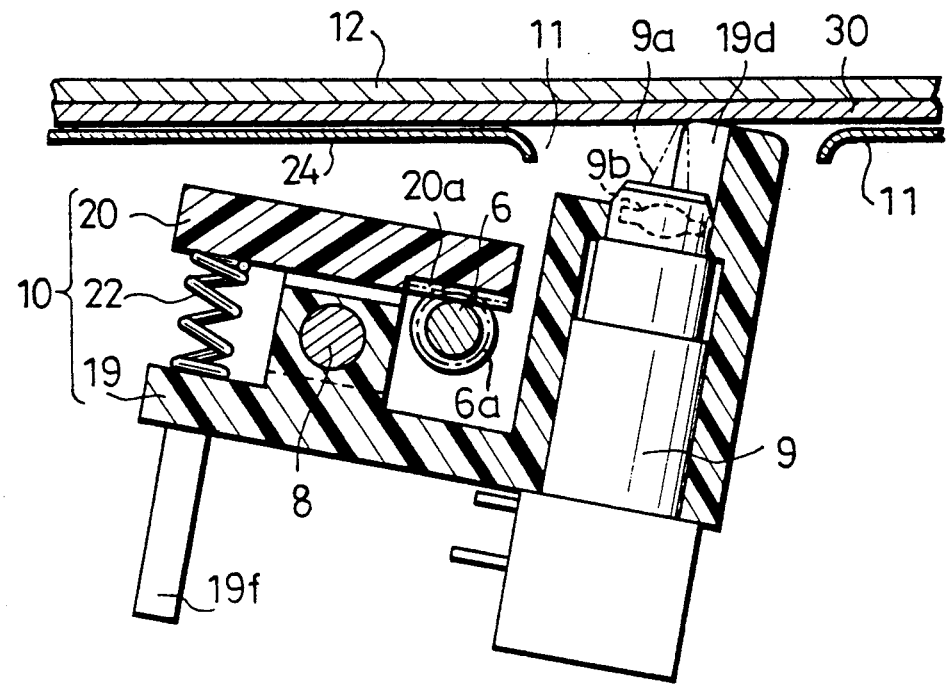
FIG. 21 is a sectional view of a sensor carrier of an optical reading device showing a sixth preferred embodiment of the present invention.
Figure 22:
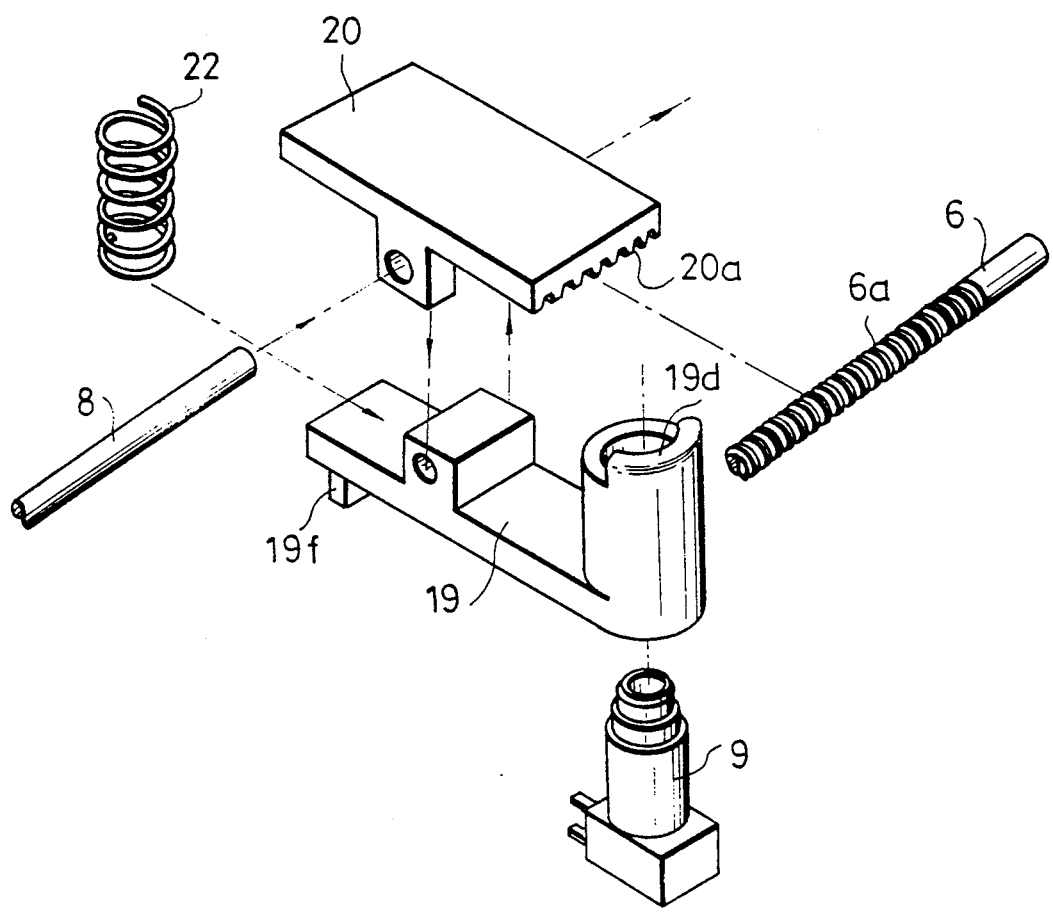
FIG. 22 is a fragmentary perspective view of the sensor carrier of FIG. 21.

As apparently seen from FIGS. 21 and 22, the sensor carrier 10 includes a base member 20 serving as an engaging member having a toothed portion 20a for meshing engagement with the spiral groove 6a of the screw shaft 6 and fitted for sliding movement on the guide shaft 8. The sensor carrier 10 further includes a holding case 19 carrying the bar code sensor 9 thereon and connected for pivotal motion to the base member 20 by means of the guide shaft 8. A coil spring 22 is interposed between the base member 20 and the holding case 19. A contact wall 19d is provided projectingly at an upper end portion of the holding case 19. The coil spring 22 normally urges the base member 20 in the clockwise direction in FIG. 21 around an axis of the guide shaft 8 while it normally urges the holding case 19 in the counterclockwise direction in FIG. 21. An interrupting plate 19f for interrupting light passages of the photointerrupters 15 to 17 which will be described below is formed on and extends downwardly from the bottom of the holding case 19.

Each of the photointerrupters 13 to 17 is an optical sensor of the type which develops an output signal when a light passage between a light emitting element and a light receiving element is interrupted. Thus, the photointerrupter 13 is a sensor for detecting a name card 30 when the name card 30 is inserted into the optical reading device from the outside; the photointerrupter 14 is a sensor for detecting that the name card 30 reaches the most interior position within the frame member 1; the photointerrupter 15 is a sensor for detecting that the sensor carrier 10 is positioned at its initial position; the photointerrupter 16 is a sensor for detecting that the sensor carrier 10 is exposed to a longitudinal end portion of the opening 11; and the photointerrupter 17 is a sensor for detecting that the sensor carrier 10 is exposed to the other longitudinal end portion of the opening 11. The stepping motor 4 and the dc motor 7 are thus controlled in accordance with output signals delivered from the photointerrupters 13 to 17.

Thus, when a name card 30 is inserted into the optical reading device by way of the name card insertion opening 18, the photointerrupter 13 will detect this and develop a signal. The stepping motor 4 is energized in response to the signal, and consequently, the name card 30 is fed toward the most interior position of the frame member 1 by the driving roller 3. When the name card 30 reaches the most interior position, it is detected by the photointerrupter 14, and the driving roller 3 is rotated reversely. Then at a point of time when a first one of a plurality of lines of coded bars on the name card 30 is exposed to the opening 11, the stepping motor 4 is stopped. During such movement of the name card 30, the sensor carier 10 remains at its initial position at the lower end location of FIG. 24. In this instance, whether or not the sensor carrier 10 is positioned at the initial position at the lower end location in FIG. 24 is discriminated depending upon whether or not the light interrupting plate 19f of the holding case 19 interrupts a light passage of the photointerrupter 15. Then, after the name card 30 is stopped with the first line bar code representation thereon exposed to the opening 11, the sensor carrier 10 is moved away from the initial position and then in the longitudinal direction along the opening 11 to read the bar code representation. In this instance, the movement of the sensor carrier 10 from one end position to the other end position of the opening 11 is detected by successive interruptions of light passages of the photointerrupters 16 and 17 by the light interrupting plate 19f. Thus, after completion of the reading operation for the bar code representation of the first line, a stopping signal is delivered to the dc motor 7, and instead, the stepping motor 4 is driven again to feed the name card 30 until the second line of the bar code representation on the name card 30 is exposed to the opening 11. A similar sequence of operations is thereafter repeated to successively read the plurality of lines of the coded bars printed on the reverse face of the name card 30 by means of the bar code sensor 9 carried on the sensor carrier 10.

In operation, a name card 30 inserted into the optical reading device is fed to the position at which a first one of a plurality of lines of coded bars printed on the rear face of the name card 30 is exposed to the opening 11, and then, the screw shaft 6 is driven to rotate so that the sensor carrier 10 is moved linearly from one to the other of a pair of positions adjacent the opposite ends of the opening 11 or vice versa under the guidance of the screw shaft 6 and the guide shaft 8. When the sensor 10 is moved in this manner, the contact walol 19d of the holding case 19 of the carrier 10 slidably moves on the reverse face of the name card 30 because the coil spring 22 normally urges the holding case 19 around the axis of the guide shaft 8 to resiliently contact the contact wall 19d of the holding case 19 with the reverse face of the name plate 30. Thus, even if there is some error in mounting position of the screw shaft 6 or the guide shaft 8, there is no possibility that the contact wall 19d may be spaced away from the name card 30 because the holding case 19 is normally acted upon by the urging force of the coil spring 22. Accordingly, the distance between a read area of the name card 30 upon which a beam 9a of light of the bar code sensor 9 is irradiated and a lens 9b of the bar code sensor 9 is maintained fixed by the contact wall 19d.

Even where the name card 30 inserted has a thickness greter than a standard one, the distance between a read area of the name card 30 and the bar code sensor 9 is maintained fixed because the contact wall 19d is always held in resilient contact with the thicker name card 30 although the holding case 19 is set to a position a little inclined in the clockwise direction in FIG. 21.

Further, since the coil spring 22 of the sensor carrier 10 normally urges the base member 20 around the axis of the guide shaft 8 and besides the screw shaft 6 and the guide shaft 8 are provided at near locations, the toothed portion 20a of the base member 20 is held in strong resilient meshing engagement with the spiral groove 6a of the screw shaft 6. Accordingly, even if there is some error in distance between the axes of the screw shaft 6 and the guide shaft 8, the toothed portion 20a of the base member 20 is certainly held in meshing engagement with the spiral groove 6a of the screw shaft 6. Consequently, the sensor carrier 10 can be smoothly moved back and forth along the screw shaft 6 and the guide shaft 8.

In this manner, with the optical reading device of the embodiment described above, after a name card 30 is inserted into the optical reading device from the outside, the contact wall 19d extending from the upper end portion of the holding case 19 is resiliently contacted with the reverse face of the name card 30 by the urging force of the coil spring 22, and the sensor carrier 10 is moved to effect reading of a bar code representation on the name card 30 while the contact wall 19d is held in contact with the name card 30. Accordingly, the distance between the bar code sensor 9 and the read area of the name card 30 is maintained fixed, and a high degree of reading reliability can be attained.

Meanwhile, where coded bars printed on the reverse face of the name card 30 extend to an end portion of the name card 30, the contact wall 19d of the holding case 19 will partially protrude from the name card 30 as seen in FIG. 23. However, since the end face of the contact wall 19d is sufficiently wide, it will not completely be disengaged from the name card 30, and accordingly, there is no possibility that, when the sensor carrier 10 is moved to the other end position of the opening 11 in the longitudinal direction, the contact wall 19d may catch the name card 30. In particular, indeed the distance between the bar code sensor 9 and the name card 30 can be stabilized only by provision of an upright small projection like a pawl in place of the contact wall 10d at the upper end portion of the holding case 19, but such small projection is likely disengaged from the name card 30 at a longitudinal end portion of the opening 11. Accordingly, there is the possibility that the small projection may catch an edge of the name card 30 when the sensor carrier 10 makes a returning movement, and the probability is high particularly where the name card 30 has a deformation such as warping. Such possible trouble is eliminated by the specific configuration of the contact wall 19d wherein it has a considerable extent at the end face thereof.

Further, since in the embodiment described above the guide shaft 8 is utilized as the center of pivotal motion of the base member 19 and the engaging member 20, the quantity of parts is reduced, and besides since the contact wall 19d of the base member 19 is set such that it can be spaced by a greater distance from the guide shaft 8, a frictional force exerted between the name card 30 and the contact wall 19d is so small that the name card 30 may not be damaged nor soiled upon reading thereof.

Furthermore, since in the embodiment described above the structure is employed wherein the toothed portion 20a of the base member 20 is held in resilient contact with the spiral groove 6a of the screw shaft 6 by the urging force of the coil spring 22 and besides the screw shaft 6 and the guide shaft 8 are provided at near locations so as to set a great spring force to be applied to the toothed portion 20a of the base member 20, even if there is some error in distance between the axes of the screw shaft 6 and the guide shaft 8 when they are assembled, the engaging relationship of the toothed portion 20a with the spiral groove 6a of the screw shaft 6 will be assured, and consequently, the driving force of the screw shaft 6 can be transmitted with certainty to the sensor carrier 10. In short, even if the distance between the axes of the screw shaft 6 and the guide shaft 8 is not defined with a high degree of accuracy, the sensor carrier 10 can be moved back and forth smoothly, and consequently, the facility in assembly is improved significantly. Further, if the sensor carrier 10 is stoped from moving by some causes, a possible overlaod to the dc motor 7 can be prevented as the screw shaft 6 is rotated idly.

It is to be noted that, while in the embodiment described above the structure is employed wherein the toothed portion 20a of the base member 20 is resiliently contacted with the screw shaft 6, the screw shaft 6 may otherwise be fitted for threaded engagement in the base member 20.

Figure 25:
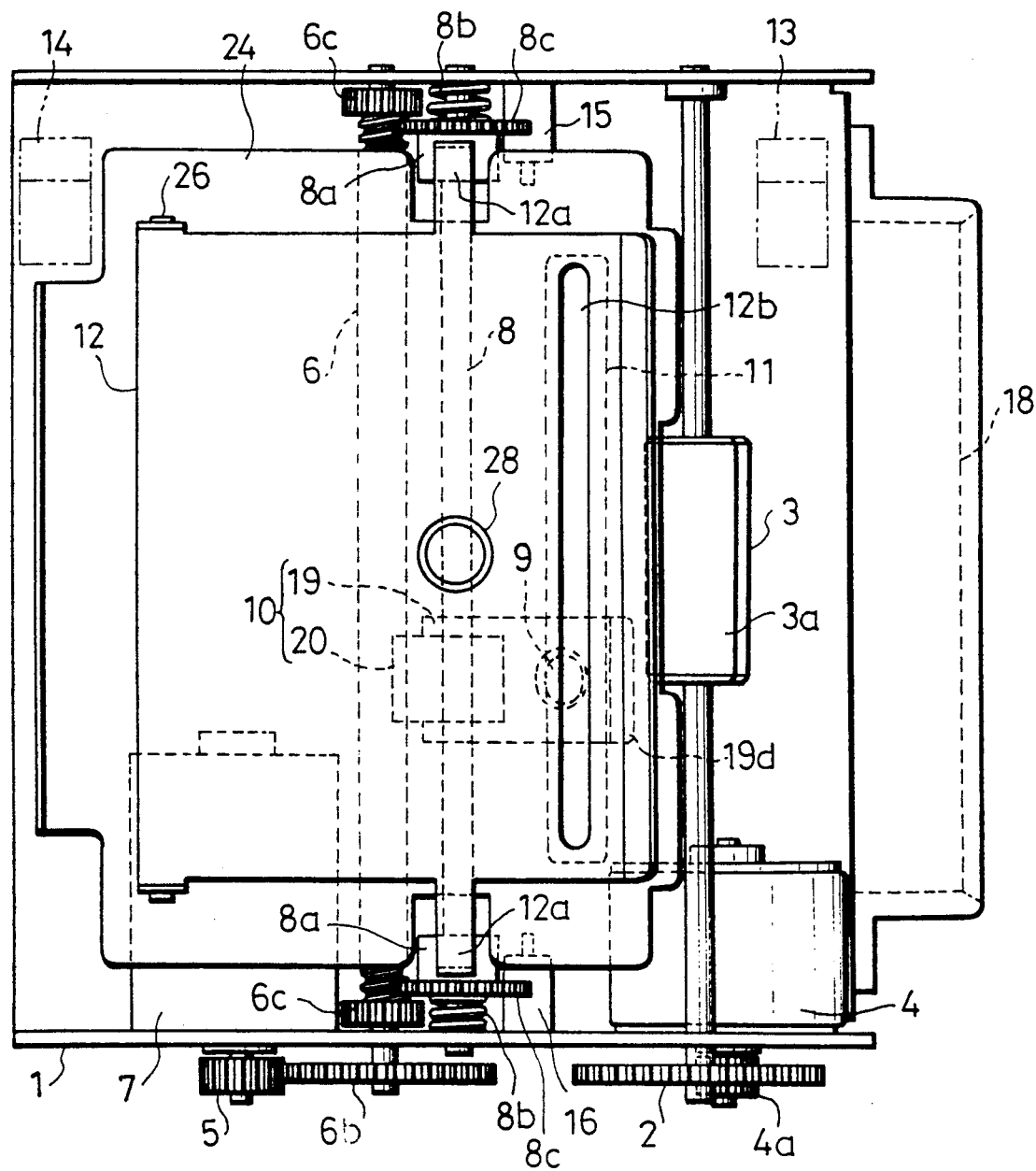
FIG. 25 is a bottom plan view of a mechanism of an optical reading device showing a seventh preferred embodiment of the present invention.

Referring now to FIGS. 25 to 29, there is shown an optical reading device according to a seventh preferred embodiment of the present invention. Referring first to FIG. 25, the optical reading device shown includes a frame member 1 in which various members or mechanisms are accommodated including a stepping motor 4 having a drive gear 4a for driving a driving roller 3 to rotate by way of a gear 2, a dc motor 7 for driving a screw shaft 6 having a driven gear 6b mounted thereon to rotate by way of a drive gear 5, a guide shaft 8 extending in parallel to the screw shaft 6, a sensor carrier 10 carrying a bar code sensor 9 thereon and adapted to be moved back and forth in up and down directions in FIG. 25 under the guidance of the screw shaft 6 and the guide shaft 8, a lower guide plate 24 having an opening 11 formed threin, an upper guide plate 12 disposed above the lower guide plate 24 and supported at an end portion thereof for pivotal motion, a pair of cams 8a for moving a pair of operating pieces 12a of the upper guide plate 12 by way of a pair of gears 6c and another pair of gears 8c, a pair of detecting photointerrupters 13 and 14, and a pair of push-button switches 15 and 16.

The driving roller 3 connected to be driven by the stepping motor 4 is provided to feed a name card 30 inserted into the inside of the frame member 1 by way of a name card insertion opening 18 in the leftward and rightward directions in FIG. 25, and a driven roller 3a is disposed to cooperate with the driving roller 3. Thus, a name card 30 inserted into the optical reading device through the name card insertion opening 18 is held between the driving roller 3 and the driven roller 3a and fed at first in the leftward direction in FIG. 25 by them, and after then, the driving roller 3 is rotated reversely to intermittently feed the name card 30 in the rightward direction in FIG. 25. Then, after completion of a reading operation, the name card 30 is discharged from the name card insertion opening 18. The name card 30 which is intermittently fed by suitable control of the stepping motor 4 is stopped each time one of a plurality of lines of coded bars printed on the rear face (lower face in FIG. 27) of the name card 30 is exposed to the opening 11.

The screw shaft 6 and the guide shaft 8 extend perpendicularly to the feeding direction of the name card 30 inserted in the optical reading device. The screw shaft 6 has a single spiral groove 6a formed on an outer periphery thereof. The gears 6c are securely mounted at the opposite end portions of the screw shaft 6 while the gears 8c having the cams 8a thereon are fitted for rotation on the opposite end portions of the guide shaft 8 and normally urged axially inwardly by a pair of coil springs 8b. Thus, if the sensor carrier 10 described below is engaged with and pushes one of the gears 8c to move axially outwardly on the guide shaft 8 against a corresponding one of the coil springs 8b, then the gear 8c is brought into meshing engagement with the corresponding gear 6c.

Figure 26:
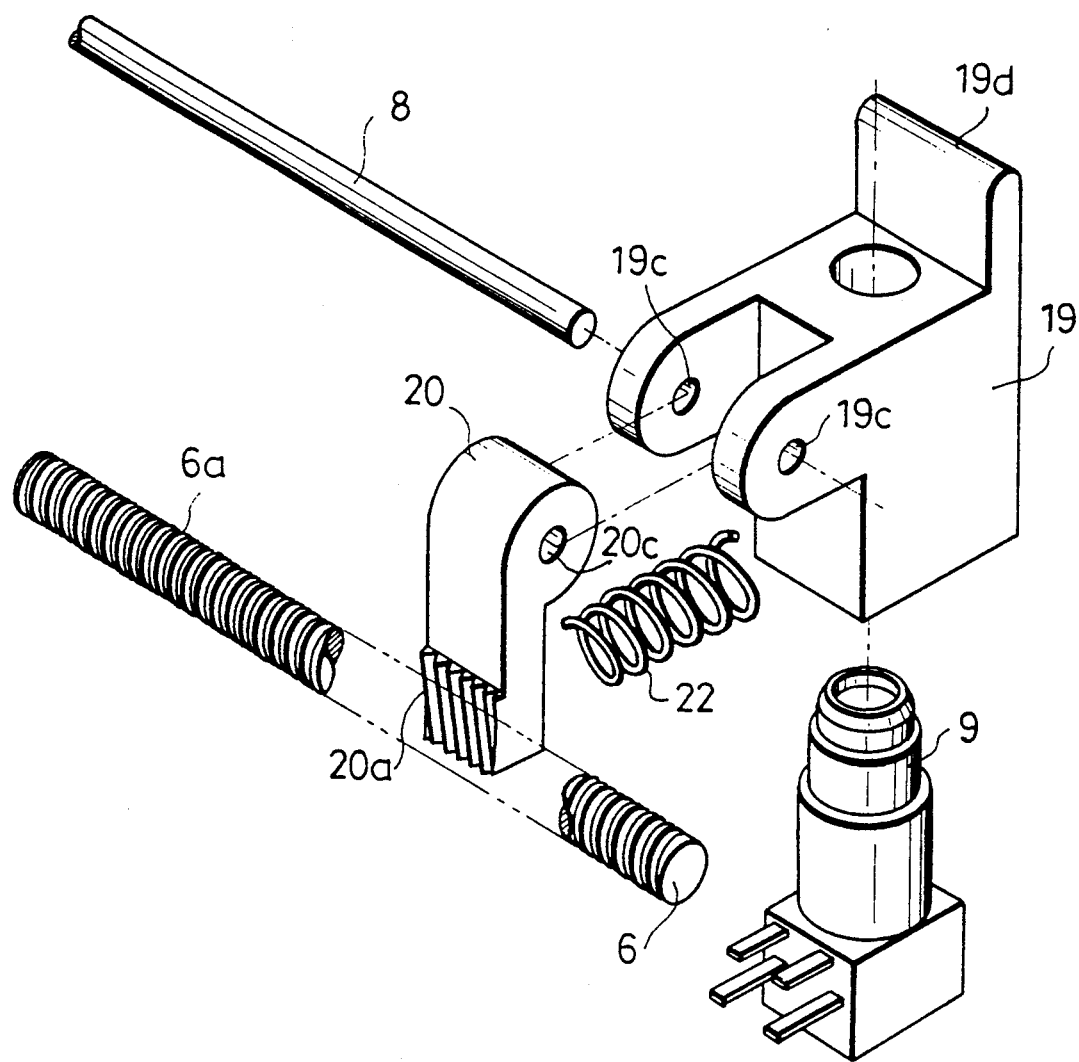
FIG. 26 is a fragmentary perspective view showing a sensor carrier of the optical reading device shown in FIG. 25.
Figure 27:
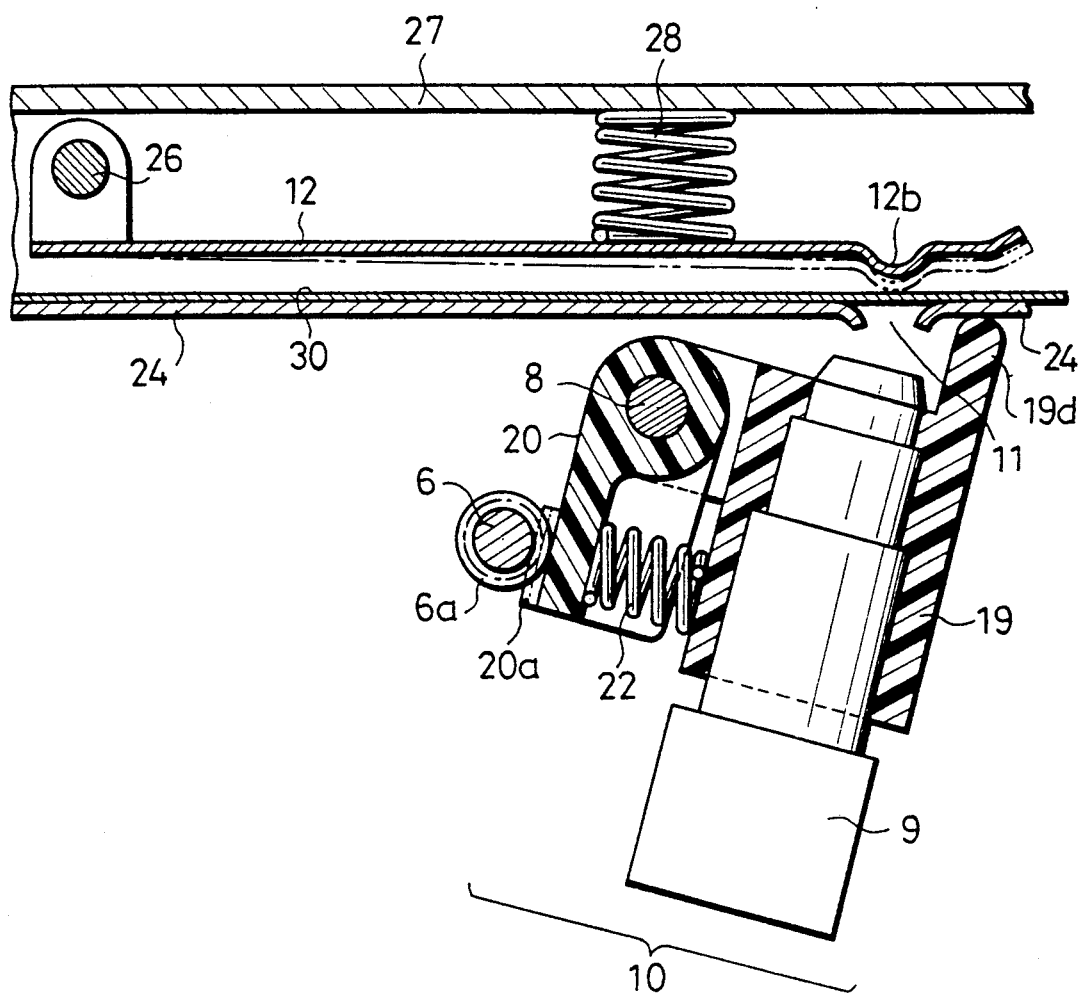
FIG. 27 is a sectional view showing the sensor carrier of FIG. 26 in an operative condition.

Referring to FIGS. 26 and 27, the sensor carrier 10 includes a base member 20 serving as an engaging member having a toothed portion 20a for meshing engagement with the spiral groove 6a of the screw shaft 6 and fitted for sliding movement on the guide shaft 8. The sensor carrier 10 further includes a holding case 19 carrying the bar code sensor 9 thereon and connected for pivotal motion to the base member 20 by means of the guide shaft 8. A coil spring 22 is interposed between the base member 20 and the holding case 19. A positioning piece 19d is provided projectingly at an edge of an end portion of the holding case 19. The coil spring 22 normally urges the base member 20 in the clockwise direction in FIG. 27 around an axis of the guide shaft 8 while it normally urges the holding case 19 in the counterclockwise direction in FIG. 27. By the urginig force of the coil spring 22, the toothed portion of the base member 20 is engaged with certainty with the spiral groove 6a of the screw shaft 6 and the positioning piece 19d of the holding case 19 is normally held in resilient contact with a portion of the lower guide plate 24 near the opening 11.

A spacing through which a name card 30 is to be fed is defined between the lower guide plate 24 and the upper guide plate 12, and an upper face of the lower guide plate 24 serves as a sliding face for a name card 30 when the card 30 is fed. When a bar code representation on such name card 30 is to be read, light of the bar code sensor 9 is irradiated into the opening 11 of the lower guide plate 24. A coil spring 28 is interposed between a top plate 27 of the optical reading device and the upper guide plate 12 which is supported for pivotal motion on a shaft 26. Thus, the coil spring 28 normally urges the upper guide plate 12 downwardly. However, since the L-shaped operating pieces 12a which are provided projectingly at the opposite ends of the upper guide plate 12 are normally held in contact with the cams 8a located adjacent the opposite end portions of the guide shaft 8, the upper guide plate 12 is moved toward and away from the the lower guide plate 24 when the cams 8a are rotated. Further, the upper guide plate 12 has a downwardly protruded pressing portion 12b formed at a location thereof corresponding to the opening 11. Thus, when the upper guide plate 12 is moved toward the lower guide plate 24 when a bar code representation on a name card 30 is to be read, the pressing portion 12b is resiliently contacted with the name card 30 above the opening 11.

Referring back to FIG. 25, the photointerrupter 13 is a sensor for detecing that a name card 30 is inserted into the optical reading device from the outside, and the photointerrupter 14 is a sensor for detecting that the name card 30 reaches the most interior position within the frame member 1. The push-button switch 15 is turned on when the sensor carrier 10 is moved to the upper end position in FIG. 25, and similarly the push-button switch 16 is turned on when the sensor carrier 10 is moved to the lower end position in FIG. 25.

In operation, when a name card 30 is inserted into the optical reading device by way of the name card insertion opening 18, the photointerrupter 13 will detect this and develop a signal. The stepping motor 4 is energized in response to the signal, and consequently, the name card 30 is fed toward the most interior position of the frame member 1 by the driving roller 3 and the driven roller 3a. When the name card 30 reaches the most interior position, it is detected by the photointerrupter 14, and the driving roller 3 is rotated reversely. Then at a point of time when a first one of a plurality of lines of coded bars on the name card 30 is exposed to the opening 11, the stepping motor 4 is stopped.

Figure 28:
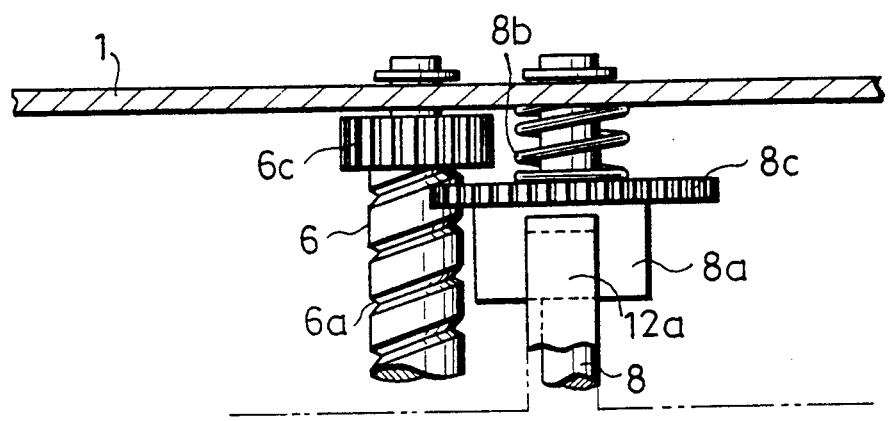
FIG. 28 is a plan view of a medium pressing mechanism shown in FIG. 27.

Then, after the name card 30 is stopped with the first line bar code representation thereon exposed to the opening 11, the sensor carrier 10 is moved in the longitudinal direction along the opening 11 under the guidance of the screw shaft 6 and the guide shaft 8 while the bar code representation is read by the bar code sensor 9. In this instance, one of the gears 8c which has been at its axially outwardly pushed position by the sensor carrier 10 is now out of meshing engagement with the corresponding gear 6c as shown in FIG. 28 while the operating pieces 12a of the upper guide plate 12 are held in a contacting relationship with a small diameter portion of the cams 8a so that the upper guide plate 12 is positioned at such a lowered position as shown in phantom in FIG. 27 by the urging force of the coil springs 28.

Consequently, the pressing portion 12b of the upper guide plate 12 is resiliently contacted with the name card 30 so that the name card 30 is positioned in the vertical direction with respect to the reference plane provided by the lower guide plate 24. Further, upon such reading operation of the bard code representation, as the sensor carrier 10 is moved, the positioning piece 19d of the holding case 19 slidably moves while it continues to resiliently contact with a portion of the lower guide plate 24 near the opening 11a. Accordingly, the distance between a read area of the name card 30 exposed to the opening 11 and a lens of the bar code sensor 9 is maintained fixed.

Figure 29:
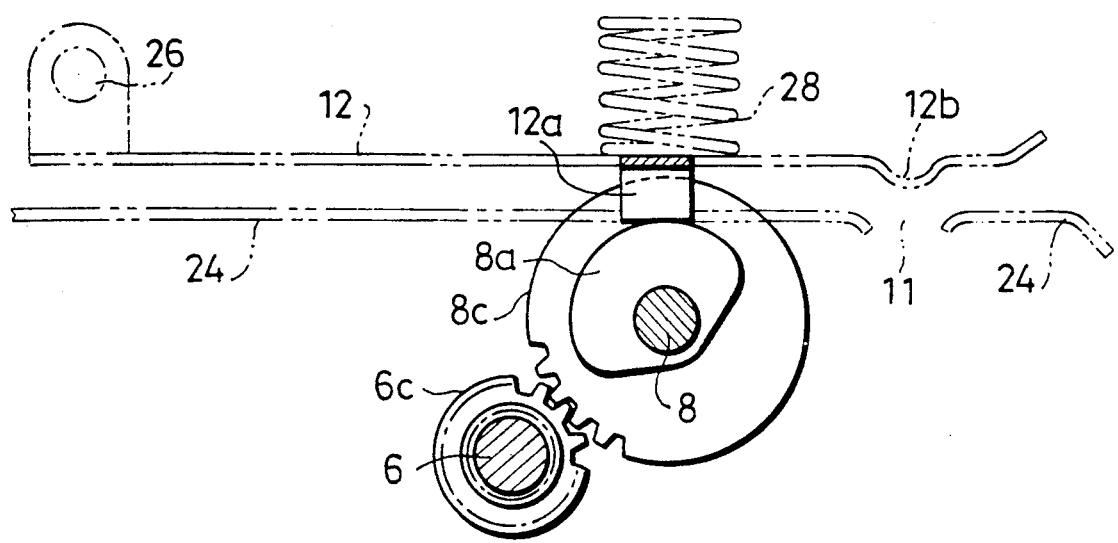
FIG. 29 is a side elevational view of the medium pressing mechanism shown in FIG. 28.

When the sensor carrier 10 comes to a longitudinal end position of the opening 11 after completion of the reading operation for the bar code representation of the one line, the corresponding gear 8c is pushed to move axially outwardly until it is brought into meshing engagement with the corresponding gear 6c. Consequently, the driving force of the screw shaft 6 is transmitted to rotate the cam 8a whereupon the corresponding operating piece 12a is pushed up by a larger diameter portion of the cam 8a to move up the pressing portion 12b of the upper guide plate 12 as shown in FIG. 29. Simultaneously, the push-button switch 15 or 16 is pushed into an on-state by the sensor carrier 10. Consequently, a stopping signal is delivered to the dc motor 7 so that rotation of the screw shaft 6 is stopped, and instead, the stepping motor 4 is driven again to feed the name card 30 until the second line of the bar code representation on the name card 30 is exposed to the opening 11.

After then, the dc motor 7 is driven again to start reverse rotation of the screw shaft 6. Consequently, the sensor carrier 10 stars its movement from the one longitudinal end position to the other longitudinal end position of the opening 11. However, since the cam 8a is rotated while the gears 6c and 8c are held in meshing engagement with each other, when the gear 8c is brought out of meshing engagement with the gear 6c, the operating piece 12a of the upper guide plate 12 remains in contact with the smaller diameter portion of the cam 8a.

A similar sequence of operations is thereafter repeated to successively read the plurality of lines of the coded bars printed on the reverse face of the name card 30 by means of the bar code sensor 9 carried on the sensor carrier 10.

In this manner, with the optical reading device of the embodiment described above, when a bar code representation on a name card 30 is to be read, the name card 30 is positioned on the reference plane provided by the lower guide plate 24, and as the sensor driver 10 is moved, the positioning piece 19d of the holding case 19 slidably moves along a portion of the lower guide plate 24 near the opening 11. Accordingly, the distance between the bar code sensor 9 and the read area of the name card 30 is maintained fixed, and a high degree of reading reliability can be attained. Besides, since the positioning piece 19d of the holding case 19 does not contact with the name card 30, the spring force of the coil spring 22 to be applied to the positioning piece 19d of the holding case 19 can be set roughly, and the structure of the sensor carrier 10 can be simplified. Besides, there is no possibility that the name card 30 may be damaged or soiled. Further, also where the material of the name card 30 is not tough against friction, there is no such disadvantage that dust may be produced and adhere to the lens of the bar code sensor 9.

Further, with the optical reading device of the embodiment described above, when the sensor carrier 10 is at its stand-by position (at the upper end position or the lower end position in FIG. 25) and accordingly reading of a bar code representation is not being performed, the upper guide plate 12 is at its pushed up position spaced away from the lower guide plate 24 by way of the gears 6c and 8c and the cams 8a. Accordingly, the resilient pressing force of the pressing portion 12b of the upper guide plate 12 against a name card 30 is canceled to allow the name card 30 to be fed smoothly between the upper and lower guide plates 24 and 12.

Furthermore, since in the embodiment described above the structure is employed wherein the toothed portion 20a of the base member 20 of the sensor carrier 10 is held in resilient contact with the spiral groove 6a of the screw shaft 6 by the urging force of the coil spring 22, even if there is some error in mounting position of the screw shaft 6 or the guide shaft 8 when they are assembled, the meshing engaging relationship of the toothed portion 20a with the spiral groove 6a of the screw shaft 6 will be assured, and consequently, the driving force of the screw shaft 6 can be transmitted with certainty to the sensor carrier 10. In short, even if the distance between the axes of the screw shaft 6 and the guide shaft 8 is not defined with a high degree of accuracy, the sensor carrier 10 can be moved back and forth smoothly, and consequently, the facility in assembly is improved significantly. Further, if the sensor carrier 10 is stopped from moving by some causes, a possible overload to the dc motor 7 can be prevented as the screw shaft 6 is rotated idly.

It is to be noted that, while in the embodiment described above the toothed portion 20a of the base member 20 of the sensor carrier 10 is resiliently contacted with the screw shaft 6, the structure of the sensor carrier 10 may be modified suitably such that, for example, the screw shaft 6 is fitted for threaded engagement in the base member 20. Further, the means for moving the upper guide plate 12 toward and away from the lower guide plate 24 is not limited to such a pressing force canceling mechanism including the cams as described above and may be of any type only if a record medium can be fed smoothly and a record face thereof can be positioned on a member which has a sliding face for the contact portion or positioning piece 19d of the holding case 19.

Having now fully described the invention, it will be apparent to one of ordinary skill in the art that many changes and modifications can be made thereto without departing from the spirit and scope of the invention as set forth herein.

What is claimed is:

1. An optical reading device, comprising:
   a holding member having a sensor of the reflecting type carried thereon;
   a supporting means provided on said holding member in a spaced relationship by a predetermined distance from a location of said sensor;
   an engaging member supported for pivotal motion by said supporting means;
   at least one of said engaging member and said holding member having a toothed portion formed thereon;
   a screw shaft having a spiral groove formed on an outer periphery thereof such that said spiral groove may be meshed by said toothed portion in a direction perpendicular to an axis of pivotal motion of said engaging member;

a first driving means for rotating said screw shaft to move said holding member in the opposite directions together with said engaging member along said screw shaft;

a medium guiding means for guiding a record medium, on which information to be read by said sensor when said holding member is moved in one or the other direction by said first driving means is optically recorded, in a predetermined plane;

a second driving means for feeding the record medium in said predetermined plane in a direction perpendicular to the direction in which said holding member is moved by said first driving means;

a guide shaft disposed in parallel to said screw shaft for guiding said sensor when said holding member is moved in one or the other direction;

a contact element provided on said holding member for assuring a minimum distance between said sensor and a surface of the record medium to be read by said sensor; and a resilient member disposed between said holding member and said engaging member for urging said holding member and said engaging member with respect to a location at which a guide portion formed either on said holding member or on said engaging member is slidably contacted with said guide shaft such that said contact element of said holding member may be resiliently contacted with a sliding face provided by the record medium or said medium guiding means and said toothed portion on said holding member or said engaging member may be resiliently engaged with said spiral groove of said screw shaft.

2. An optical reading device according to claim 1, wherein said toothed portion is formed in an integral relationship on said engaging member.

3. An optical reading device according to claim 1, wherein the reading optical axis of said sensor is maintained at an angle less than 90 degrees with respect to the record medium.

4. An optical reading device according to claim 1, wherein the record medium is a name card formed from a base member in the form of a flat plate having a surface on which bar code information formed from optically recorded bars and spaces to be read by said sensor is recorded in an area and general information of a character or characters and/or a figure or figures is recorded in an area other than the area in which the bar code information is recorded.

5. An optical reading device according to claim 1, wherein said supporting means provided on said holding member and a portion of said holding member at which said holding member is guided by said guide shaft have a pair of cylindrical holes formed in a spaced relationship by a predetermined distance and extending in parallel to each other.

6. An optical reading device according to claim 5, wherein a support shaft extends in parallel to said guide shaft through the cylindrical hole in said holding member and another cylindrical hole formed in said engaging member to support said holding member and said engaging member for pivotal motion relative to each other.

7. An optical reading device according to claim 6, wherein said holding member and said engaging member are held in contact with each other at end faces thereof through which said cylindrical holes are formed in such a manner as to allow pivotal motion of said holding member and said engaging member relative to each other.

8. An optical reading device according to claim 1, wherein said medium guiding means includes a first guide member for guiding a record face of the record medium in said predetermined plane and a second guide member for guiding the reverse face of the record medium, and the sliding face is a portion of the record face of the record medium which is positioned between said second guide member and said contact element on said holding member.

9. An optical reading device according to claim 8, wherein said contact element of said holding member extends through an opening formed in said first guide member and slides on the record face of the record medium when said holding member is moved by and along said screw shaft.

10. An optical reading device according to claim 9, wherein the locus of sliding movement of said contact element of said holding member is displaced from the locus of detecting movement of said sensor in the feeding direction of the record medium.

11. An optical reading device according to claim 1, wherein said toothed portion on said holding member or said engaging member is held in meshing engagement under the resilient force of said resilient member with part of an outer periphery of said spiral groove formed in said screw shaft.

12. An optical reading device according to claim 1, further comprising a cam member located in a corresponding relationship to a portion of an optical record face of the record medium on which no information is recorded for contacting with an abutting portion provided on said holding member to pivot said holding member to move said contact element away from said sliding face as said holding member is moved.

13. An optical reading device according to claim 1, wherein the distance from said supporting means to said contact element which contacts with said sliding face is set greater than the distance from said supporting means to said toothed portion which contacts with said spiral groove of said screw shaft.

14. An optical reading device according to claim 13, wherein said engaging member which is supported for pivotal motion by said supporting means has said toothed portion formed in an integral relationship thereon and has said guide portion formed thereon for being guided by said guide shaft.

15. An optical reading device according to claim 1, wherein the sliding face is a record face of the medium on which information to be read is recorded, and the position at which the record face and said contact element of said holding member are contacted with each other is spaced from the location of said guide shaft in the feeding direction of the record medium.

16. An optical reading device according to claim 15, wherein said contact element of said holding member which contacts with the record face of the record medium applies the resilient force from said resilient member to the record medium at an inclined angle with respect to the feeding direction of the record medium.

17. An optical reading device according to claim 1, wherein said supporting means and said holding member which is supported for rotation by said supporting means are supported in a coaxial relationship on said guide shaft.

18. An optical reading device according to claim 1, wherein said toothed portion is formed on an inner periphery of a support shaft member securely mounted in a cylindrical hole formed in said holding member around the axis of pivotal motion of said holding member while said engaging member is supported for pivotal motion at a portion of said support shaft member extending from said holding member, and a location at which said guide shaft is slidably contacted with a guide groove formed in said engaging member serves as a reference position of the resilient force of said resilient member.

19. An optical reading device according to claim 1, wherein said contact element provided on said holding member is formed in such a manner as to contact at a plurality of locations with said sliding face at an inclined relationship in the feeding direction of the record medium and the locations of said contact element are connected to each other.

20. An optical reading device according to claim 19, wherein said contact element is formed in an integral relationship from a same material with said holding member.

21. An optical reading device according to claim 1, wherein said medium guiding means includes a first guide member for guiding a record face of the record medium, a second guide member for guiding the reverse face of the record medium, and a medium pressing means for resiliently pressing the record medium laterally against a face of said first guide member while permitting the record medium to be fed in the plane, and said sliding face for contacting with said contact element of said holding member is provided by the other face of said first guide member opposing to said sensor.

22. An optical reading device according to claim 21, wherein said medium pressing means includes a medium pressing portion formed on said second guide member for contacting with the reverse face of the record medium, a pivotally supporting mechanism for supporting said second guide member for pivotal motion to move said medium pressing portion toward and away from the record medium, and an urging member for resiliently urging said second guide member with reference to said pivotally supporting mechanism to move said medium pressing portion toward said first guide member.

23. An optical reading device according to claim 21, further comprising a pressing force canceling mechanism provided at a location outside a preset portion of the range of movement of said contact element of said holding member within which the record medium is read by said sensor for canceling the pressing force of resiliently pressing said medium pressing means against the record medium.

24. An optical reading device according to claim 23, wherein said pressing force canceling mechanism includes a pair of driving gears located adjacent the opposite ends of said screw shaft for integral rotation with said screw shaft, a pair of driven gears located proximate said driving gears such that each of said driven gears may be brought into meshing engagement with a corresponding one of said driving gears when said holding member is moved to a corresponding end of the range of movement thereof, a pair of canceling cams mounted for individually integral rotation with said driven gears, and a pair of operating elements provided on said second guide member and cooperating with said canceling cams to cancel the pressing operation of said medium pressing means.

25. An optical reading device according to claim 24, further comprising a detecting means located adjacent the opposite ends of the range of movement of said contact element formed on said holding member for detecting said holding member, and a controlling means for stopping rotation of said screw shaft in response to detection of said holding member by said detecting means.

* * * * *